United States Patent [19]
Oka

[11] Patent Number: 5,760,345
[45] Date of Patent: Jun. 2, 1998

[54] TELE-WRITING SYSTEM, FOR EACH OTHER CHANGING IMAGE DISPLAYED ON ANOTHER TERMINAL, HAVING FUNCTION OF IDENTIFYING DOCUMENT TO BE PROCESSED IN TELE-WRITING OPERATION

[75] Inventor: Kouji Oka, Isehara, Japan

[73] Assignee: Ricoh Company, Ltd., Tokyo, Japan

[21] Appl. No.: 560,389

[22] Filed: Nov. 17, 1995

Related U.S. Application Data

[63] Continuation of Ser. No. 185,399, Jan. 24, 1994, Pat. No. 5,521,335.

[30] Foreign Application Priority Data

Jan. 28, 1993 [JP] Japan .................................. 5-12114
Oct. 19, 1993 [JP] Japan .................................. 5-260932

[51] Int. Cl.[6] .................. G08C 21/00; H04M 11/00
[52] U.S. Cl. .................................. 178/18; 379/100.15
[58] Field of Search .................. 178/18; 379/93, 379/96; 345/156; 348/13–19

[56] References Cited

U.S. PATENT DOCUMENTS 4,654,483  3/1987  Imai et al. .................................. 379/93
5,176,520  1/1993  Hamilton .................................. 379/96 X
5,432,525  7/1995  Maruo et al. .................................. 342/2

*Primary Examiner*—Stephen Chin
*Assistant Examiner*—Kevim Kim
*Attorney, Agent, or Firm*—Oblon, Spivak, McClelland, Maier & Neustadt, P.C.

[57] ABSTRACT

An identifier-adding unit adds an identifier to sending tele-writing information to be sent from the first tele-wiring system to a second tele-writing system via telecommunication. The identifier is used to identify a document to be processed as a result of a tele-writing operation being specified. This causes a second picture displayed on the second tele-wiring system to be affected, if appropriate, according to the sending tele-writing information. The information corresponds to a first tele-writing operation for affecting a first picture displayed on the first tele-writing system. A document identifying unit identifies, using an identifier added to received tele-writing information sent from the second tele-writing system to the first tele-writing system, a corresponding document to be processed as a result of the tele-writing operation being specified.

6 Claims, 20 Drawing Sheets

FIG. 8

| LOCAL TERMINAL NUMBER = 1 |
|---|
| DOCUMENT IDENTIFIER = DOCUMENT 1 |
| PAGE NUMBER = 1 ST PAGE |
| SEQUENTIAL NUMBER = N |
| PARTICULAR INFORMATION (ABSOLUTE COORDINATE INFORMATION CONCERNING FREE DRAWING) |

FIG. 13

| RECEIVED FROM REMOTE TERMINAL / IN LOCAL TERMINAL | ADDITION OPERATION | DELETION OPERATION | ALTERATION OPERATION |
|---|---|---|---|
| NO TELE-WRITING OPERATION BEING SPECIFIED | TASK-1 | TASK-2 | TASK-3 |
| ADDITION OPERATION BEING SPECIFIED | TASK-1 | TASK-2 | TASK-4 |
| DELETION OPERATION BEING SPECIFIED | TASK-1 | TASK-2 | TASK-5 |
| ALTERATION OPERATION BEING SPECIFIED | TASK-1 | TASK-2 | TASK-6 |

TELE-WRITING SYSTEM, FOR EACH OTHER CHANGING IMAGE DISPLAYED ON ANOTHER TERMINAL, HAVING FUNCTION OF IDENTIFYING DOCUMENT TO BE PROCESSED IN TELE-WRITING OPERATION

This is a Continuation of application Ser. No. 08/185,399 filed on Jan. 24, 1994 now U.S. Pat. No. 5,521,335.

BACKGROUND OF THE INVENTION

The present invention relates to a tele-writing terminal device by which drawing information, such as that concerning texts and/or figures, as well as information concerning voice is transferred through mutual communications via a communication network such as an Integrated Service Digital Network (ISDN hereinafter), a telephone communication network, or a private line network. The present invention in particular relates to a tele-writing terminal device, a conference system being realized by interconnecting a plurality of the tele-writing terminal devices.

An example of a conference system realized by interconnecting a plurality of a tele-writing terminal devices will now be described. A plurality of documents may be simultaneously displayed commonly on the display devices associated with respective ones of the plurality of tele-writing terminal devices. In such a case, if each conference member arbitrarily and randomly specifies adding/deleting operations so as to affect the displayed documents, the displayed documents are affected in a disorderly fashion affected, resulting in confusion in the conference.

In order to prevent such confusion, the following system may be used: A concept of control right such as addition/deletion right is used so that only a tele-writing terminal device, among those holding the conference, which currently has the control right can be allowed to perform an addition/deletion operation so as to affect the common picture comprising the displayed documents. In this specification, the term addition operation means an operation, normally performed by an operator on a relevant terminal device which operation is intended, to affect a picture, representing figures and/or texts, so that a certain element, comprising a line, dot, etc. for example, is added to the existing picture. Further, the term deletion operation means an operation, performance of which operation is intended to affect a picture, representing figures and/or texts, so that a certain element, comprising a line, dot, etc. for example, is removed from the existing picture. Further, the term alteration operation means an operation, performance of which operation is intended to affect a picture, representing figures and/or texts, so that the picture is magnified in size or is reduced in size or is replaced by another one stored in a predetermined storage, for example.

Another system as follows using the above proposed system may also be used: In the other system, information concerning performance of an addition/deletion operation to affect the common picture, occurring in the tele-writing terminal device not having the control right, is effectively used. That is, the addition/deletion operation information is first sent to the tele-writing terminal device having the control right, said tele-writing terminal device then determines for the sent information as follows: Said tele-writing terminal device determines whether the sent information is valid so that the corresponding addition/deletion operation is allowed to be performed so as to affect the common picture or the sent information is invalid so as to be ignored. Such a system is disclosed in Japanese Patent Laid-Open Application No. 3-150939, for example.

Certain difficulties/problems may arise in such a system as that of the former example wherein only a conference member whose terminal has the control right is allowed to perform the addition/deletion operation so as to affect the common picture. Such difficulties/problems may arise, for example, when hot debate occurs in the conference. Then, transfer of the control right to the terminal of a conference member who wishes to argue by affecting the common picture is problematic.

Another problem may occur in a system such as that of the latter example wherein a conference member whose terminal has the control right may allow/reject an addition/deletion operation, to be performed on the common picture, requested by another member whose terminal thus does not have the control right. In that case, actually, the following system may be employed in practice: First, in the terminal not having the control right, the relevant addition/deletion operation is specified by the operator temporarily so as to affect the picture displayed on the terminal's screen. Information concerning the relevant addition/deletion operation is sent to the terminal having the control right. Then, in the terminal possessing the control right, based on the received relevant information, the same addition/deletion operation is specified by the operator so as to temporarily affect the picture displayed on the terminal's screen. Then, the conference member whose terminal has the control right determines whether the relevant addition/deletion will be allowed or rejected. In the case of rejection, the temporary effect of the relevant addition/deletion operation is canceled from the picture displayed on the screen of the terminal possessing the control right. Simultaneously, information indicating the determination result of rejection is sent to the terminal not possessing the control right. Then, at the terminal not possessing the control right, based on the result of rejection, the temporary effect of the relevant addition/deletion operation is canceled also from the picture displayed on the screen of the terminal not possessing the control right. As described above, the actual process comprises a rather complicated control process.

Further, in the above system, the following difficulties/problems may arise: It may occur that respective addition/deletion operations are simultaneously specified by the corresponding operators on a plurality of terminals, each not having the control right so that the common picture is affected accordingly. In such a case, the conference member whose terminal has the control right must decide between plurality of requests.

SUMMARY OF THE INVENTION

An object of the present invention is to provide a tele-writing terminal device which enables proper selection of a document from among a plurality of documents which may constitute the common picture, performance of the relevant addition/deletion operation affecting the selected document.

Another object of the present invention is to provide a tele-writing terminal device which enables unrestricted and straightward/simple performance of addition/deletion operations so as to affect the common picture without carrying out either transfer of the control right or complex operations associated with the control right which cause operation performance to be degraded.

To achieve the above objects of the present invention, a tele-writing system according to the present invention comprises:

identifier-adding means for adding an identifier to sending tele-writing information to be sent from the first tele-writing system to a second tele-writing system by telecommunication, said identifier being used to identify a document to be affected by a tele-writing operation, in which a second picture displayed on said second tele-writing system is affected, if appropriate, according to said sending tele-writing information, which corresponds to a first tele-writing operation for affecting a first picture displayed on said first tele-writing system; and document identifying means for identifying, using an identifier added to received tele-writing information sent from said second tele-writing system to said first tele-writing system, a document to be affected by said tele-writing operation.

The above system may further comprise:

page-number adding means for adding a page number to said sending tele-writing information, said page number concerning a page of a document, which page is to be affected by said tele-writing operation; and page identifying means for identifying, using a page number added to said received tele-writing information, a corresponding page to be affected by said tele-writing operation.

As a result, identification of a page of the document as well as identification of the document, on which page the relevant addition/deletion is to be performed, can be ensured.

The above system may further comprise:

terminal-number adding means for adding a terminal number to said sending tele-writing information, said terminal number concerning said tele-writing system; and terminal identifying means for identifying, using a terminal number added to said received tele-writing information, said second tele-writing system.

As a result, easy identification of the terminal which sends the relevant information is enabled.

The above system may further comprise:

sequential-number adding means for adding a sequential number to said sending tele-writing information, said sequential number being either incremented or decremented, as is appropriate, depending on which kind of tele-writing operation is specified on said first tele-writing system;

comparing means for comparing said sequential number with a sequential number added to said received tele-writing information;

sequential-number updating means for either incrementing or decrementing the sequential number as is appropriate according to the result of the comparison performed by said comparing means;

difference detecting means for detecting a difference between said first and second pictures based on said result of said comparison performed by said comparing means; and correcting means for correcting said difference detected by said difference detecting means.

Further, said correcting means may comprise re-affecting means for causing operations once performed on said first picture to take effect again according to said first tele-writing operation.

As a result, the capability of making pictures displayed on respective terminals screens identical is provided.

The above system may comprise examining means for examining contents of said received tele-writing information along and also examining the combination of said received and sending tele-writing information so as to determine how said first tele-writing system processes said received and sending tele-writing information. As a result, the received tele-writing information can be processed in the first tele-writing system properly. Further, the result of the received tele-writing information may be displayed on the first tele-writing system's screen so that the operator may easily confirm the contents of the received tele-writing information.

The above system may further comprise invalidating means for invalidating said receiving tele-writing information if appropriate according to the result of the examination carried out by said determining means. As a result, improvement in the operation performance may be realized.

The above system may further comprise returning means for returning said receiving tele-writing information to said second tele-writing system if appropriate according to the result of the examination carried out by said determining means. As a result, improvement in the operation performance may be realized because the displayed pictures can be kept consistent with one another.

The above system may further comprise editing means for editing said receiving tele-writing information if and as appropriate according to the result of the examination carried out by said determining means. As a result, improvement in the operation performance may be realized because the operator associated with the second tele-writing system may confirm the result of the editing resulting form the examination.

The above system may further comprise designating means for designating an appropriate action procedure for each command included in the tele-writing information, said action procedure concerning whether a one-way procedure or a return procedure is designated, wherein, in said one-way procedure, the command is used for affecting said first picture and then sent to said second tele-writing system and then used for affecting said second picture; and in said return procedure, the command is first sent to said second tele-writing system for the purpose of affecting said second picture and then sent back to said first tele-writing system for the purpose of affecting said first picture.

Further, in the above system:

said one-way procedure is designated for the command indicating addition of contents to said first and second pictures;

said return procedure is designated for the command indicating deletion of contents from said first and second pictures; and said return procedure is designated for the command indicating predetermined alteration of the displaying style of said first and second pictures or replacement of the contents of said first and second pictures with other previously stored contents.

As a result, improvement in the operation performance may be realized because the tele-writing process may be carried out appropriately to each command.

Other objects and further features of the present invention will become more apparent from the following detailed description when read in conjunction with the accompanying drawings.

BRIEF DESCRIPTION OF THE DRAWINGS

FIG. 8 shows an example of the tele-writing information in the first embodiment of the tele-writing system according to the present invention;

FIG. 13 shows a determination table for determining a task to be carried out when the tele-writing information is received in the second embodiment of the tele-writing system according to the present invention;

DESCRIPTION OF PREFERRED EMBODIMENTS

Figure 1:
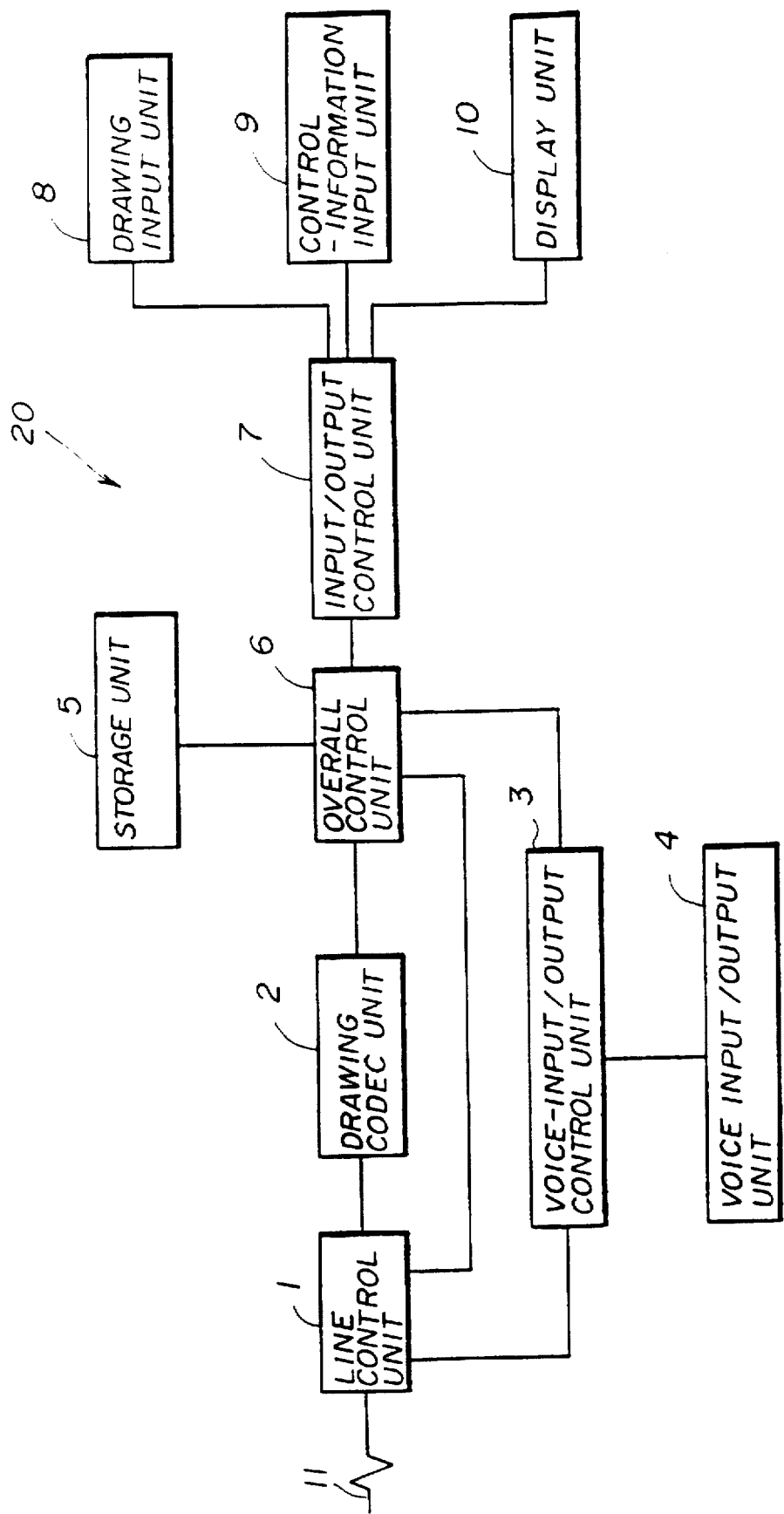
FIG.1 shows a block diagram of a tele-writing terminal device in a first embodiment of a tele-writing system according to the present invention.

Embodiments of the present invention will now be described with reference to drawings.

|FIRST EMBODIMENT|

A tele-writing terminal device in a first embodiment of the tele-writing system according to the present invention will now be described with reference to FIGS. 1–10. First, a construction will be described with reference to FIG. 1. The tele-writing terminal device 20 of FIG. 1 comprises a line control unit 1, a drawing coder and decoder (coder and decoder will be referred to as CODEC, hereinafter) unit 2, a voice-input/output control unit 3, a voice input/output unit 4, a storage unit 5, an overall control unit 6, an input/output control unit 7, a drawing input unit 8, a control-information input unit 9 and a display unit 10. This tele-writing terminal device 20 has a capability of communication such that the device 20 can communicate voice information and drawing information with one or a plurality of tele-writing terminal devices.

The circuit control unit 1 acts as an interface between the tele-writing terminal device 20 and the communication line 11. The drawing CODEC unit 2 performs coding and decoding of drawing information. The voice input/output control unit 3 controls input and output of voice information. The unit 3 includes a voice CODEC unit for analog-to-digital converting in a case where the device 20 is connected to ISDN. The voice input/output unit 4 performs input and output of voice information and may comprise devices such as a telephone handset, a microphone, and speaker, for example.

The overall control unit 6 performs overall control of the tele-writing terminal device 20. The input/output unit 7 controls input and output of information such as drawing information and/or control information. The drawing input unit 8 inputs drawing information. The control-information input unit 9 inputs control information. The display unit 10 displays drawing information and/or control information for example and displays a common picture comprising drawing information resulting from the mutual communication. The communication line 11 comprises ISDN, a telephone line or a private line.

Figure 2:
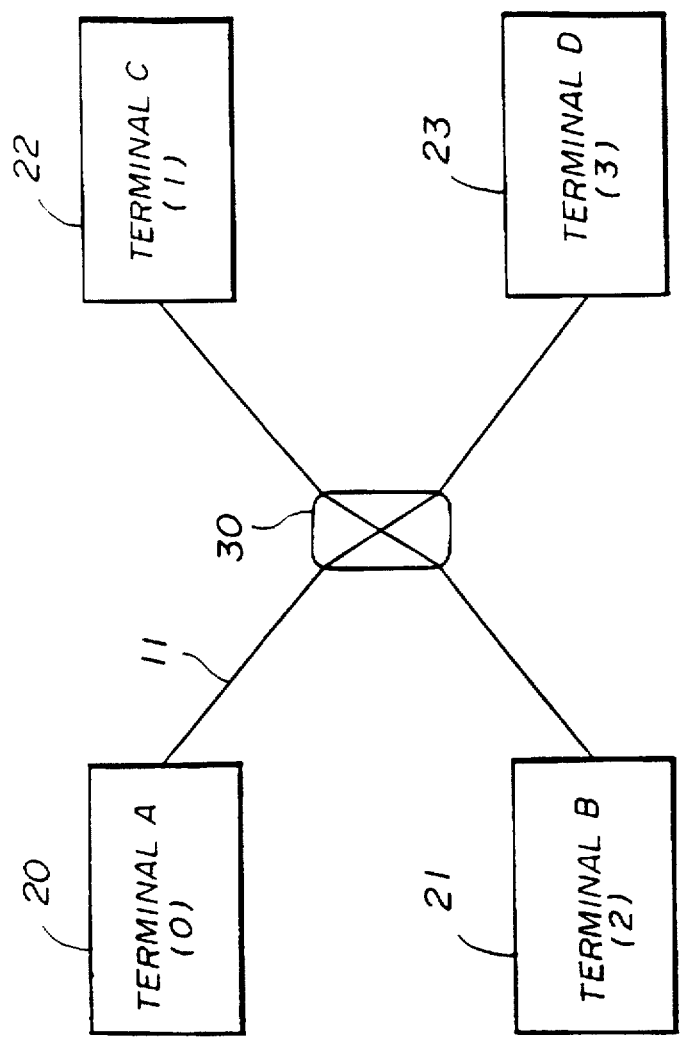
FIG. 2 shows a block diagram of a conference system comprising tele-writing terminal devices as shown in FIG. 1.

A conference system comprising tele-writing terminal devices including the above described tele-writing terminal device 20 (may be referred to simply as a terminal A) will now be described with reference to FIG. 2. Each of the other tele-writing terminal devices 21, 22 and 23 (may be referred to simply as a terminals B, D and E respectively as shown in FIG. 2, hereinafter) comprises a construction similar to that of the tele-writing terminal device 20. These terminals A–D are located in respective regions separate from each other and connected with each other as shown in FIG. 2 through a network or a conference controller 30 via the line 11. There may be another example where a plurality of terminals are located in the same region. In such a case, the terminals A and B are located in a region and the terminals C and D are located in another region.

There, as described above, the tele-writing terminal device 20 has the following capability: The device 20 is connected with one or a plurality of remote terminal devices via a predetermined line; the device 20 sends and/or receives tele-writing information including drawing information; the device 20 displays a picture common to one displayed on the remote terminal device; and performance of an addition/deletion operation may affect the common picture, which operation is specified by the corresponding operator on either the device 20 itself or the remote terminal device. The overall control unit 6 thereof comprises the following means: document-identifier adding means; document identification means; page-number adding means; page identification means; terminal-number adding means; terminal identification means; sequential-number adding means; comparing means; sequential-number updating means; display-difference detecting means; and re-affecting means.

The overall control unit 6, now acting as the document-identifier adding means, adds, to the above tele-writing information, a document identifier for identifying a document, which document performance of the above addition/deletion operation will affect. This addition is carried out before the above tele-writing information is sent out. The overall control unit 6, now acting as the document identification means, identifies the document which the above addition/deletion operation will affect. This identification is carried out, when the tele-writing information is received, using the identifier added to the received tele-writing information.

The overall control unit 6, now acting as the page-number adding means, adds, to the above tele-writing information, a document page number for identifying a page of the document, which page the above addition/deletion operation will affect. This addition is carried out before the above tele-writing information is sent out. The overall control unit 6, now acting as the page identifying means, identifies the page of the document, which page the above addition/deletion operation will affect. This identification is carried out, when the tele-writing information is received, using the document page number added to the received tele-writing information.

The overall control unit 6, now acting as the terminal-number adding means, adds, to the above tele-writing information, a terminal number which has been previously set for the device 20 itself. The overall control unit 6, now acting as the terminal identifying means, identifies the terminal, on which terminal the relevant addition/deletion operation is specified by the operator. This identification is carried out, when the tele-writing information is received, using the corresponding terminal number added to the received tele-writing information.

The overall control unit 6, now acting as the sequential-number adding means, adds a sequential number on the tele-writing information before this tele-writing information is sent out. The sequential number is a number previously set on the terminal 20 itself (local terminal, hereinafter) and is altered (or updated) as appropriate to which operation among a plurality of predetermined addition/deletion operations has been specified by the operator. The overall control unit 6, now acting as the comparing means, compares between the sequential number added to the received tele-writing information and the sequential number set on the local terminal. This comparison is carried out when the received tele-writing is received. The overall control unit 6, now acting as the sequential-number updating means, updates (or alters) the locally set sequential number as appropriate to the result of the above comparison carried out by the comparing means. The overall control unit 6, now acting as the display-difference detecting means, detects, based on the result of the comparison, a difference between the common pictures displayed on the local terminal and the remote terminal. The overall control unit 6, now acting as the re-affecting means, causes the performance of the addition/deletion operation to take effect again, this affecting by the addition/deletion operation having been once made before the difference in the common pictures is thus detected. This re-affecting is carried out if the difference in the common pictures is detected by the display-difference detecting means.

Figure 3:
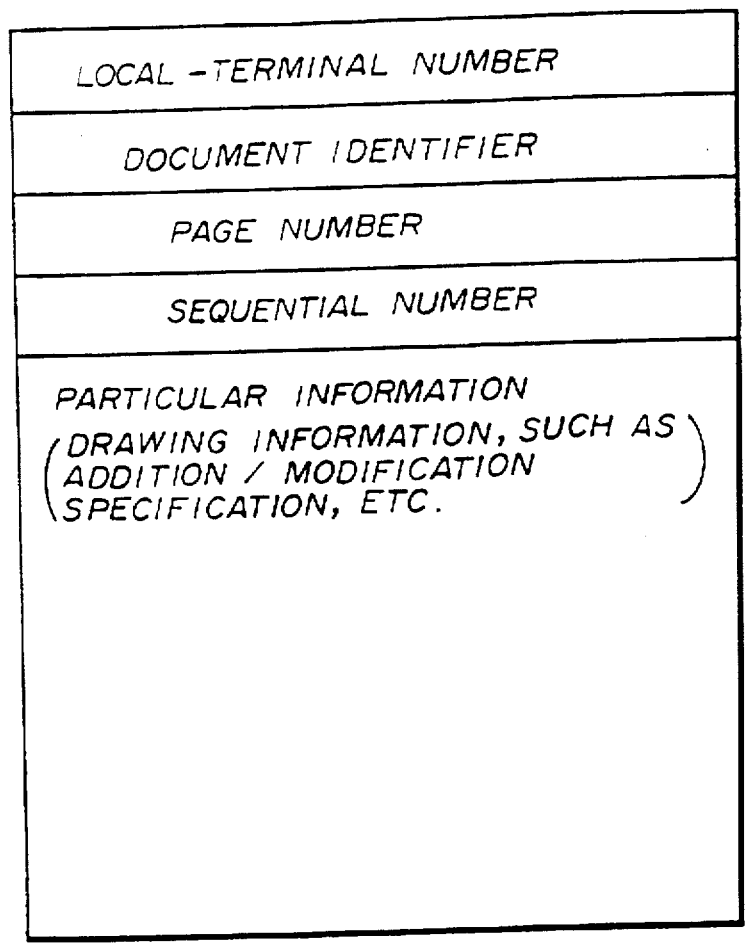
FIG. 3 shows an example of a format for tele-writing information, to be transferred between respective tele-writing terminal devices, in the first embodiment of the tele-writing system according to the present invention.
Figure 4:
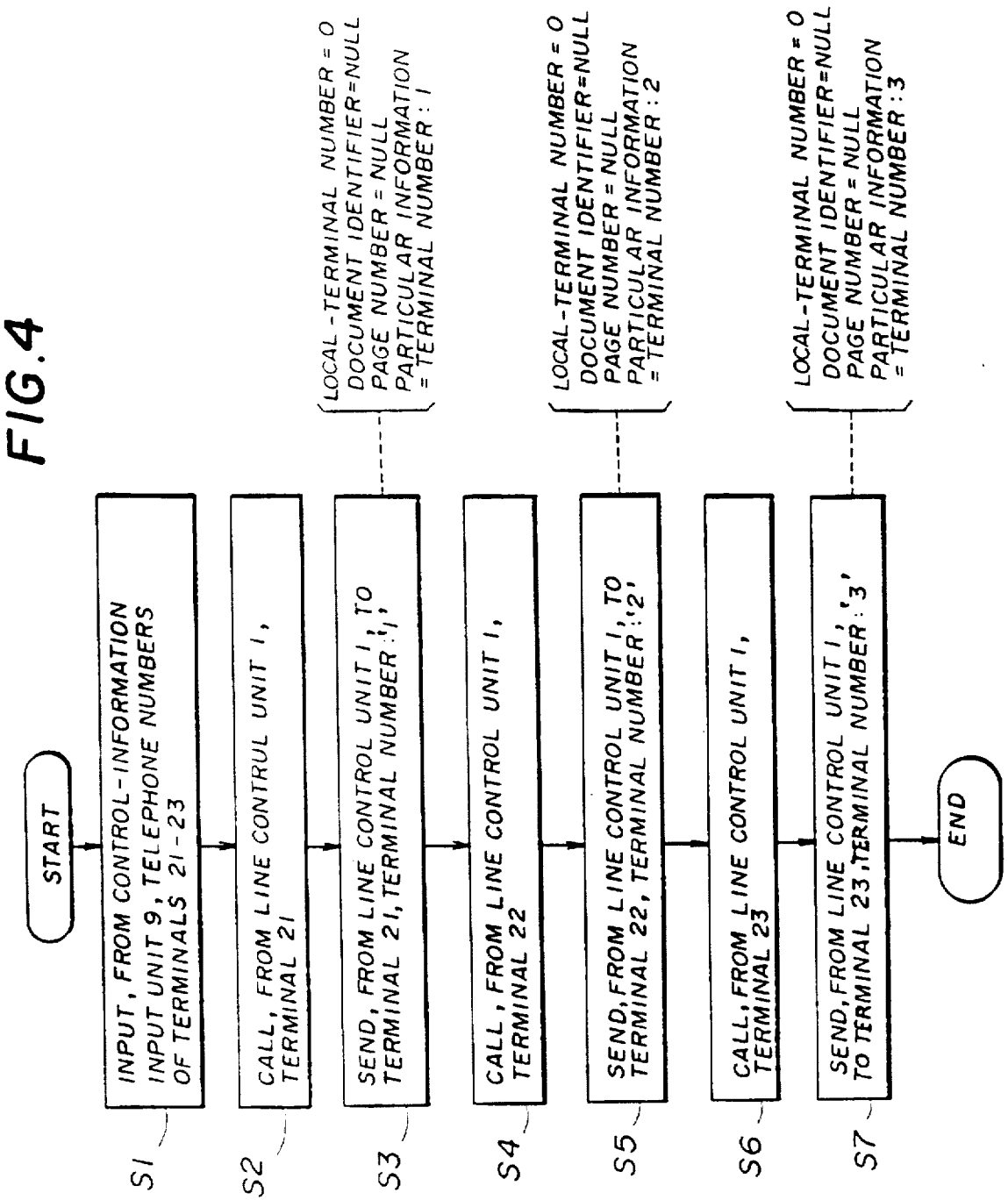
FIG. 4 shows an operation flow at the beginning of a conference held in the conference system of FIG. 2 in the first embodiment of the tele-writing system according to the present invention.

As shown in FIG. 3, a local terminal number, a document identifier, a page number and a sequential number are added to the tele-writing information.

Operations carried out in the tele-writing terminal device 20 in the first embodiment of the tele-writing system according to the present invention will now be described with reference to FIGS. 4–10.

First, in step $S_1$ (the term step will be omitted, hereinafter), telephone numbers of the remote terminal devices associated with a plurality of conference members who will attend the conference are input. The input telephone numbers are, via the input/output control unit 7, sent to the line control unit 1. In $S_2$, calling is performed to the terminal device 21. The above operations are managed/controlled by the overall control unit 6. The unit 6 subsequently sends terminal numbers which will be used by the respective remote terminal devices in $S_3$. The reason for this transmission is as follows: The generation, by the calling side terminal, of the terminal numbers for all of the remote terminal devices prevents terminal numbers from being duplicated. In $S_4$–$S_7$, the operations similar to those in $S_2$ and $S_3$ are performed but on the remote terminal devices 22 and 23 respectively.

Figure 5:
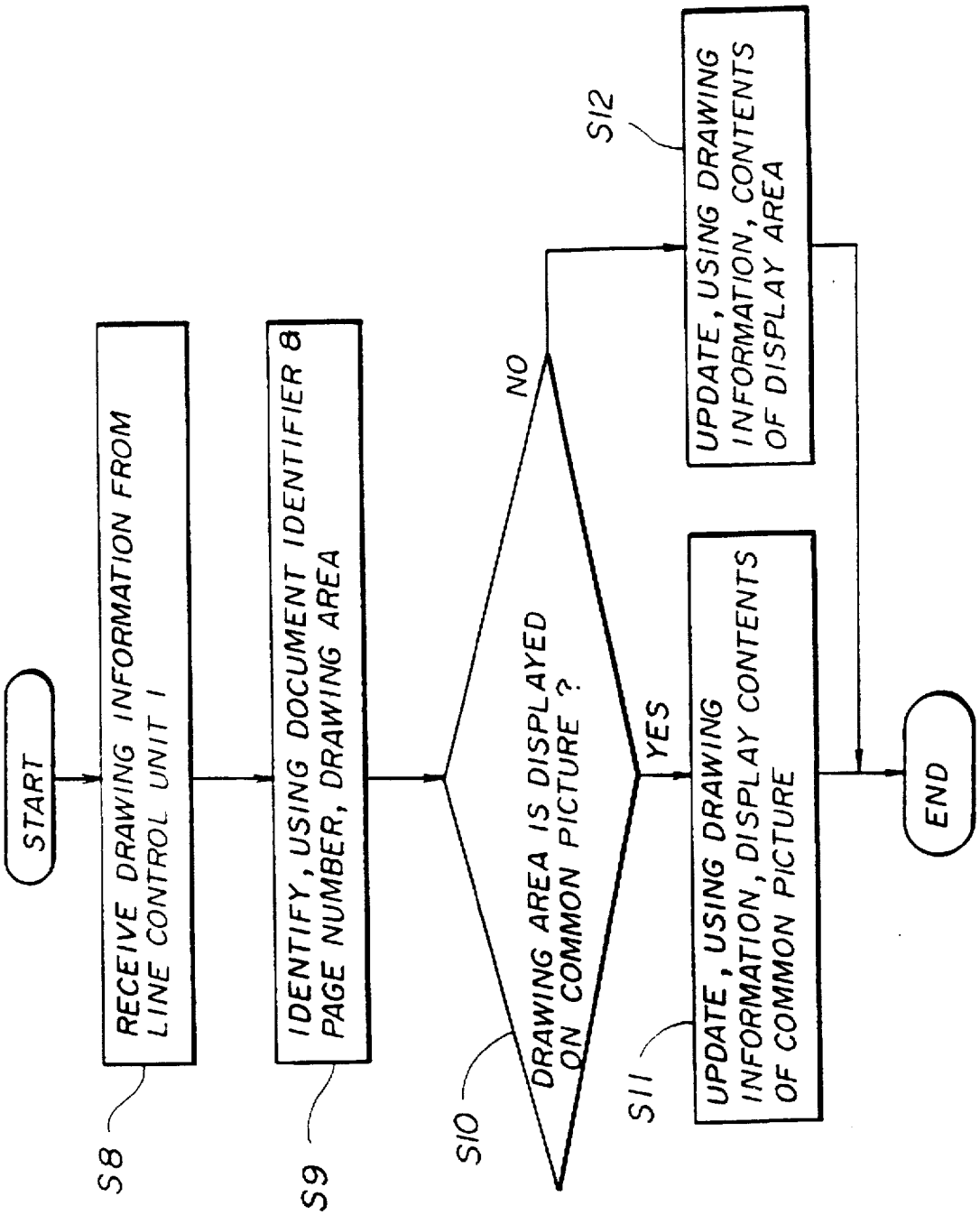
FIG. 5 shows an operation flow for document identification and display updating in the first embodiment of the tele-writing system according to the present invention.

Next, an operation flow when the drawing information is received will be described with reference to FIG. 5.

In $S_8$, the tele-writing information is received via the line control unit 1. This tele-writing information has the format shown in FIG. 3 for example. According to this format, in $S_9$, the document identifier and page number are extracted from the received tele-writing information. Using this extracted information, the document and page thereof to be affected by performance of an addition/deletion operation, are identified, that is, a drawing area is determined.

In $S_{10}$, if the determined drawing area is being displayed as a common picture, updating of the common picture is executed as follows in $S_{11}$: Using drawing information such as that concerning drawing line type and drawing position, drawing contents are derived; and the common picture is updated using the derived drawing contents. On the other hand, if the determined drawing area is not being displayed as the common picture, information concerning the display contents in this drawing area is only stored in the storage unit 5. Therefore, In $S_{12}$, using drawing information such as that concerning drawing line type and drawing position, drawing contents are derived; and the display contents in the drawing area stored in the storage unit 5 are updated using the derived drawing contents.

Figure 6:
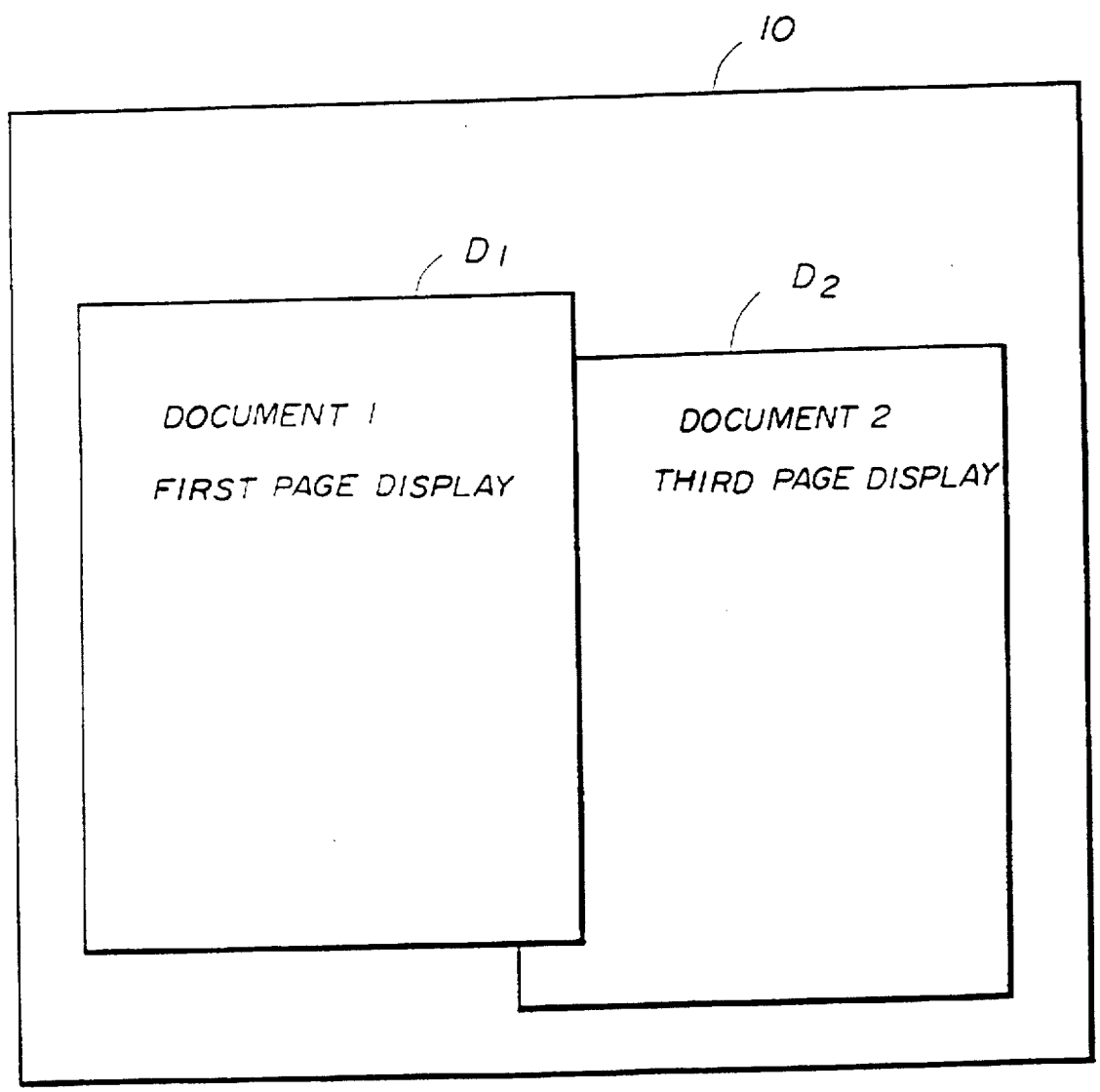
FIG. 6 shows an example of a display on a display unit in the first embodiment of the tele-writing system according to the present invention.
Figure 7A:
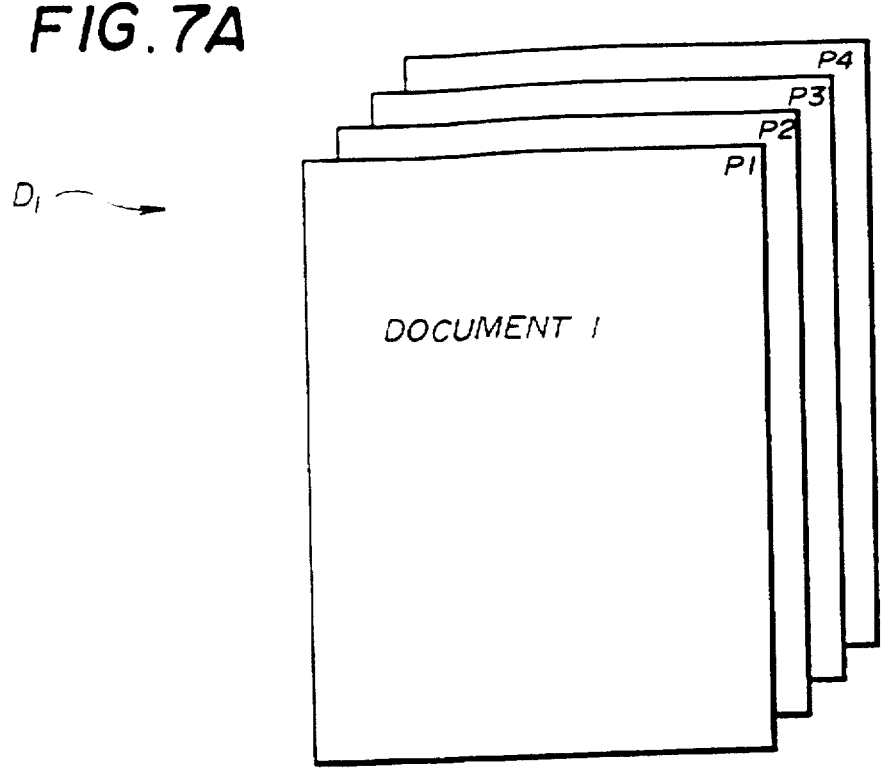
FIGS. 7A and 7B show respective displayed documents each comprising pluralities of pages, in the first embodiment of the tele-writing system according to the present invention.
Figure 7B:
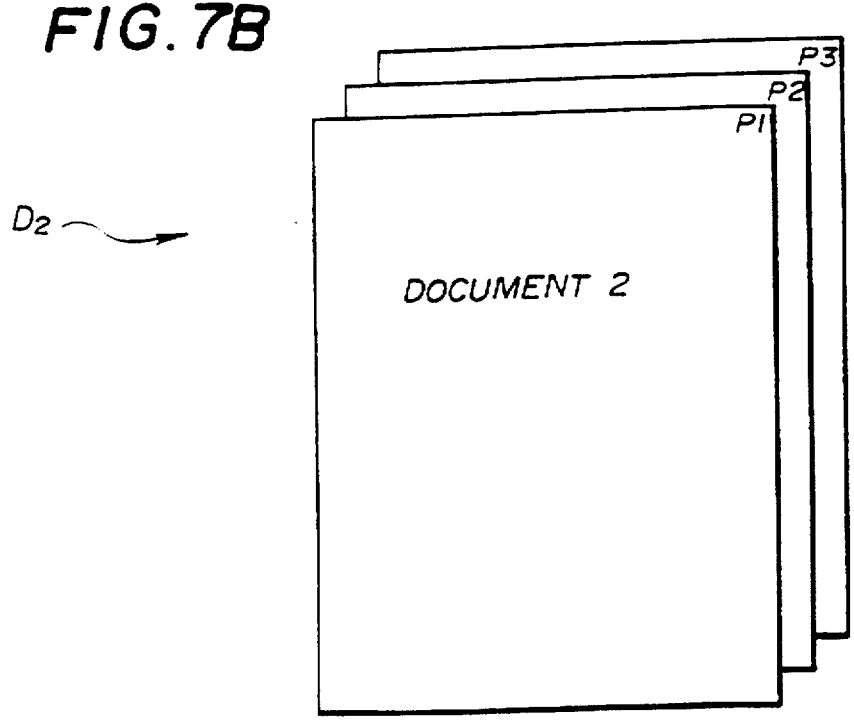

An example of the display of documents on the screen of the display unit 10 will now be described with reference to FIG. 6. On the screen, as shown in FIG. 6, two different documents $D_1$ and $D_2$ are displayed simultaneously. As shown in FIG. 7A, the first document $D_1$ comprises 4 pages while the second document $D_2$ comprises 3 pages as shown in FIG. 7B. On the screen of FIG. 6, the first page of the document $D_1$ and the third page of the document $D_2$ are displayed. There, it is possible to make performance of tele-writing operation affect the respective document 1 ($D_1$) and document 2 ($D_2$). For example, the terminal B performs free drawing on the first page of the document 1. In this case, the corresponding tele-writing information comprises drawing information, shown in FIG. 8, having the local terminal number, document identifier and page number set accordingly.

The sequential number will now be described with reference to FIG. 9. There, the description will be made using an example of data communication between the terminals A and B.

Sequential numbers Na and Nb are stored in the terminals A and B respectively and the stored sequential numbers become the terminals' local terminal sequential numbers respectively. When an addition/deletion operation is specified by the operator, the sequential number N, identical to the local-terminal sequential number, is added to the relevant tele-writing information. In this tele-writing terminal device in the first embodiment, the local terminal number is updated in the following manner: When a deletion operation is specified by the operator on the terminal, 1 is added to the terminal's current local-terminal sequential number; and When (the local-terminal sequential number)≦(received sequential number), the local-terminal sequential number becomes this received sequential number. Such a updating procedure is only an example, and any other procedure may be used, such as adding 1 to the local-terminal sequential number when an addition operation is specified by the operator.

First, in $S_{32}$, after an addition operation is specified by the operator on the terminal A and the relevant addition-operation information is sent to the terminal B, an addition operation is specified by the operator on the terminal B and the relevant addition-operation information is sent to the terminal A. As a result of such processes as those in $S_{32}$, no difference occurs between the resulting common document pictures displayed on the respective terminals.

In $S_{33}$, addition operations are specified by the operators on the terminals A and B respectively and simultaneously and the relevant addition-operation information packets are sent to the counterpart terminals respectively. As a result of processes such as those in $S_{33}$, no difference occurs between the resulting common document pictures displayed on the respective terminals because the specified operations comprise addition operations respectively.

In $S_{34}$, after a deletion operation is specified by the operator on the terminal A and the relevant deletion-operation information is sent to the terminal B, an addition operation is specified by the operator on the terminal B and the relevant addition-operation information is sent to the terminal A. As a result of processes such as those in $S_{34}$, no difference occurs between the resulting common document pictures displayed on the respective terminals.

Figure 10:
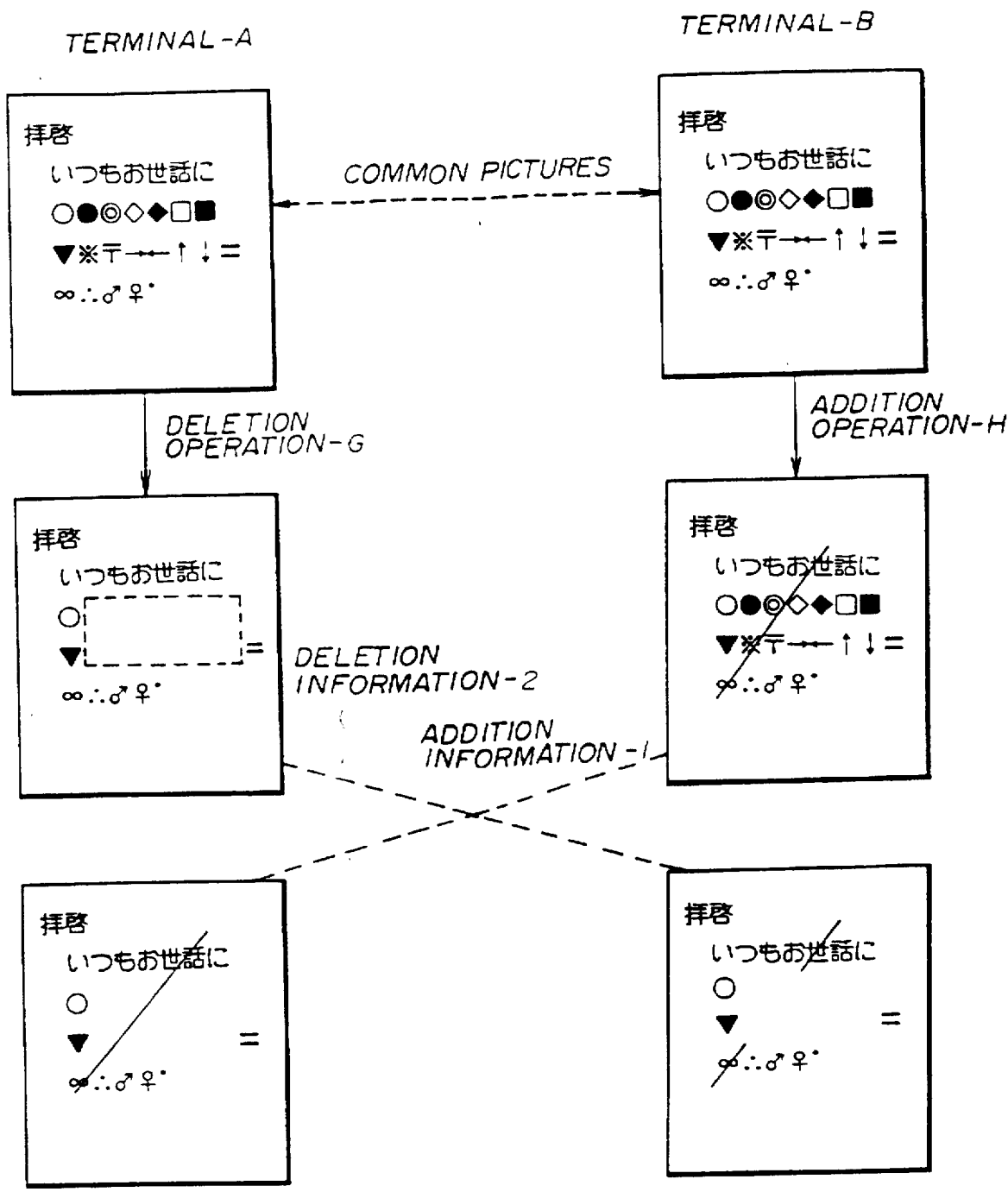
FIG. 10 illustrates the undesirable difference generation process generating differences in pictures displayed on screens of respective terminals in the first embodiment of the tele-writing system according to the present invention.

In $S_{35}$, the following operations are simultaneously specified: a deletion operation is specified by the operator on the terminal A and an addition operation is specified by the operator on the terminal B. Then, the relevant deletion-operation and addition-operation information packets are sent to the counter-part terminals respectively. As a result of processes such as those in $S_{35}$, a difference may occur between the resulting common document pictures displayed on the respective terminals A and B. That is, as shown in FIG. 10, at the top, both common pictures of the respective terminals A (left) and B (right) are identical. Then, a deletion operation G and an addition operation H are specified by the operators on the terminals A and B simultaneously respectively. As a result, the resulting common pictures become those shown at the center of FIG. 10. Then, tele-writing information packets, indicating the relevant deletion operation G and addition operation H respectively, are sent to the counter-part terminals B and A respectively. In accordance with the sent tele-writing information packets, the performance of the addition operation H and the deletion operation G affect the pictures of the terminals A and B, respectively. As a result, the respective pictures are different from one another as shown at the bottom of FIG. 10 (the oblique line is continuous at the left picture and broken on the right). Such a difference may be detected as follows: Comparison is performed between the local-terminal sequential number and the received sequential number in the terminal A; and as a result, if (the local-terminal sequential number)>(the received sequential number), a difference exists between the two resulting pictures. Then, after the difference is detected, the following operation can remove such a difference so as to make both the pictures identical: In the terminal A, after the performance of the addition operation H affects the terminal A's picture, the deletion operation G, having once previously affected the picture before the specification of the addition operation H by the operator, is again applied to the picture. As a result, the oblique line of the picture shown at the bottom-left of FIG. 10 becomes broken, identically to the picture shown at the bottom-right of FIG. 10.

Figure 9:
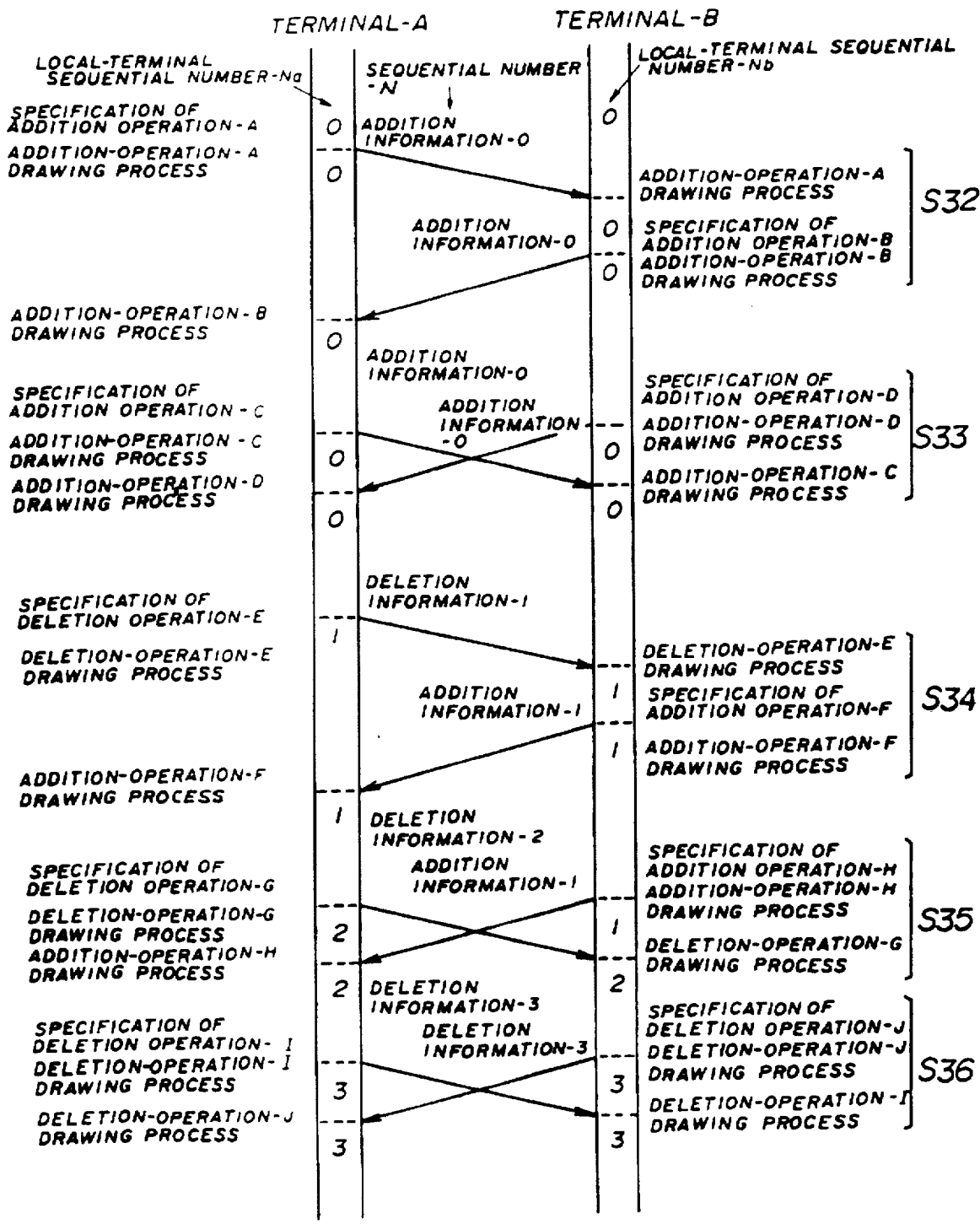
FIG. 9 shows an example of a sequential-number updating operation sequence in which the tele-writing information is transferred between the terminals in the first embodiment of the tele-writing system according to the present invention.

In $S_{36}$ of FIG. 9, deletion operations are simultaneously specified by the operators on both the terminals A and B and the relevant deletion-operation information packets are sent to the counter-part terminals B and A. As a result of processes such as those in $S_{36}$, no difference occurs between the resulting common document pictures displayed on the respective terminals because the specified operations comprise deletion operations respectively.

The above description of the tele-writing terminal device in the first embodiment of the tele-writing system according to the present invention will now be summarized. The document identifier is added to the tele-writing information when the tele-writing information is sent. By this identifier, a document is identified in the remote terminal device which has received the relevant tele-writing information, which document performance of an addition/deletion operation will affect. As a result, addition/deletion operations may be arbitrarily specified by the operators on the respective tele-writing terminal devices even if a plurality of documents are simultaneously displayed as each of the common pictures. Further, transfer operation of control right among the tele-writing terminal devices may be eliminated so that operation performance can be improved.

Further, not only information for identifying the relevant document but also information for identifying the relevant page therein is added to the relevant tele-writing information. Thus, the relevant page can be properly identified.

Furthermore, even the terminal number of the terminal device which has sent the relevant tele-writing information is added to the tele-writing information. Therefore, the remote terminal device can properly identify the information-source terminal device. As a result, an operation is enabled such as that the destination terminal device may request resending of the relevant information to the information-source terminal device easily and properly, for example. Thus, operation performance can be improved.

Further, the possibility can be eliminated that a difference occurs between pictures displayed on the respective terminals due to simultaneous specifications of addition and/or deletion operations by the operators in the respective terminals. This elimination can be achieved as a result of detecting the occurrence of such a difference as described above and in response to this, proper counter-measures as described above can be taken so as to remove the difference.

(SECOND EMBODIMENT)

A tele-writing terminal device in a second embodiment of the tele-writing system according to the present invention may be applied to the above tele-writing terminal device, described with reference to FIGS. 1–10, in the first embodiment of the tele-writing system according to the present invention. Here, characteristic parts of the tele-writing terminal device in the second embodiment will now be described concretely. First, in the above tele-writing terminal device in the first embodiment, as indicated by the determination in $S_{10}$ and the process in $S_{12}$ in FIG. 5, the affecting may be made as a result of deriving the drawing contents of the relevant drawing area, even if the relevant drawing area is not displayed on the common picture. However, in this way, the storage unit has to bear a load proportional to the number of drawing areas and thus there may be a case of excessive loading to be borne by the storage unit. In order to prevent such a problem, in the tele-writing terminal device in the second embodiment, the following processes are performed: A currently displayed drawing area is always made to be coincident between both the terminals. That is, even if displayed-page alteration, followed by corresponding displayed-drawing-area alteration, is performed on one terminal, the corresponding displayed-drawing-area alteration is also performed on the other terminal simultaneously. As a result, communication data used in the tele-writing process may comprise data concerning a drawing area being made to be coincident between the respective terminals. Accordingly, the need for the processes of $S_{10}$ and $_{12}$ may be eliminated. The tele-writing terminal device in the second embodiment of the tele-writing system according to the present invention will now be described with the corresponding drawings.

A signal-transfer sequence example according to the second embodiment of the present invention will now be described with reference to FIG. 11. $S_{50}$ comprises processes in which an addition operation is specified by the operator. $S_{50}$ will now be described with reference to FIG. 12. First, the operator associated with the terminal A specifies an addition operation on the terminal A and accordingly the terminal A determines in $S_{80}$ that a tele-writing operation exists. Because the relevant tele-writing operation comprises the addition operation in this case, the terminal A performs the following operations: The terminal A draws the corresponding object on the drawing area of the picture displayed on the terminal A (thus the performance of the addition operation affects the drawing area), and edits transmission data correspondingly ($S_{88}$). Then, the terminal A sends the edited data to the terminal B via the line control unit ($S_{89}$). On the other hand, the terminal B determined in $S_{80}$ that no tele-writing operation exists because the operator associated with the terminal B does not performs any tele-writing operation. Then, in $S_{81}$, the terminal B determines that receiving data exists because the data sent from the terminal A in $S_{89}$ as mentioned above is transferred to the terminal B. Then, the terminal B accepts the data via the line control unit in $S_{82}$. Then, in $S_{83}$, the terminal B determines the relevant drawing area using the document identifier and page number indicated by the thus received data.

Then, the terminal B determines in $S_{84}$ using the terminal number indicated by the received data whether or not a command indicated by the same data comprises a returning command of a go-and-return type command. Go-and-return type command means a type of command which will be transmitted from a first terminal to a second terminal and then the same command is returned to the first terminal. Returning command means the command which are thus being returned. Because the relevant command comprises a one-way command in this case, the NO branch is selected in $S_{84}$. Then, in $S_{85}$, the terminal B determines an affecting task from among predetermined tasks shown in FIG. 13 and this determination is executed in accordance with the table shown in FIG. 13. In this case, the terminal B now acting as the local-terminal has no tele-writing operation specified by its own operator (thus the top line of the table is selected) and the data received from the terminal A now acting as the remote terminal comprises the addition-operation affecting command (thus the leftmost row is selected). As a result, TASK-1 (located at the top-left of the table of FIG. 13) is selected. Accordingly, the terminal B branches off into the selected TASK-1 in $S_{86}$ and executes TASK-1 in $S_{87}$. The process performed in TASK-1 will now be described with reference to FIG. 14A. In TASK-1, the terminal draws a certain object on a relevant drawing area so as to be affected in accordance with an addition-operation affecting command indicated by received data in $S_{93}$. This operation will now be applied to the above described case where the terminal B has received the data indicating the addition-operation affecting command from the terminal A. As a result, in TASK-1 in $S_{87}$ of FIG. 12, the terminal B draws the above object on the relevant drawing area displayed on its own picture so as to cause the area to be affected by the addition-operation affecting command indicated by the data received from the terminal A. Thus, $S_{50}$ of FIG. 11 has been described. Further, $S_{51}$ of FIG. 11 is a step in a case where the terminal B sends data to the terminal A. Thus, $S_{51}$ is similar to $S_{50}$ but the roles played by the terminals A and B are interchanged.

$S_{52}$ in FIG. 11 will now be described with reference to FIG. 12 and is a signal-transfer sequence example in which a deletion operation is specified by the operator. First, the operator of the terminal A specifies a deletion-operation on the terminal A and thus the terminal A determines in $S_{80}$ that a tele-writing operation exists. Because the relevant existing tele-writing operation comprises the deletion operation in this case, the terminal A only correspondingly edits transmission data in $S_{88}$. Thus, the performance of the deletion operation does not take immediate effect but will take effect when the terminal A receives a returning command of the relevant deletion-operation information in the second embodiment of the tele-writing system according to the present invention. The reason for such an operation procedure will be described below at the description of $S_{62}$ of FIG. 15. Here, as mentioned above, the performance of the deletion operation affects the drawing area when the terminal A receives the returning command of the deletion-operation information as will be described now. The transmission data edited in $S_{88}$ as mentioned above is sent to the terminal B via the line control unit in $S_{89}$. On the other hand, the terminal B has no tele-writing operation specified by its own operator and determines in $S_{80}$ that no tele-writing operation exists. Then, because the data sent from the terminal A in $S_{89}$ as mentioned above arrives at the terminal B, the terminal B determines in $S_{81}$ that receiving data exists. Then, the terminal B accepts the thus arrived data via the line control unit in $S_{82}$. Then, the terminal B determines in $S_{83}$ the drawing area, which area the relevant performance of the tele-writing operation indicated by the accepted data affects. This determination is executed using the document identifier and page number indicated by the accepted data.

Then, the terminal B determines in $S_{84}$ using the terminal number indicated by the received data whether or not a command indicated by the same data comprises the returning command of the go-and-return type command such as described above. Because the relevant command comprises a going command of the go-and-return type command in this case, the branch of NO is selected in $S_{84}$. Then, in $S_{85}$, the terminal B determines an affecting task from among predetermined tasks shown in FIG. 13 and this determination is executed in accordance with the table shown in FIG. 13. In this case, the terminal B now acting as the local-terminal has no tele-writing operation specified by its own operator (thus the top line of the table is selected) and the data received from the terminal A now acting as the remote terminal comprises the deletion-operation affecting command (thus the middle row is selected). As a result, TASK-2 (located at the top-middle of the table of FIG. 13) is selected. Accordingly, the terminal B branches off into the selected TASK-2 in $S_{86}$ and executes TASK-2 in $S_{87}$. The process performed in TASK-2 will now be described with reference to FIG. 14B. In TASK-2, the terminal removes a specified element from a relevant drawing area so as to cause the area to be affected by a deletion-operation affecting command indicated by received data in $S_{94}$. Further, because all of deletion-operation affecting commands are go-and-return type commands, the terminal sends back the received data to the remote terminal as it is in $S_{95}$. These operations will now be applied to the above described case where the terminal B has received the data indicating the deletion-operation affecting command from the terminal A. In TASK-2 in $S_{87}$ of FIG. 12, first, the terminal B removes, in S94, a specified element from the relevant drawing area displayed in its own picture so as to cause the area to be affected by the deletion-operation affecting command indicated by the data received from the terminal A. Then, in $S_{95}$, the terminal B sends back the received data to the terminal A as it is. Then, the terminal A, after receiving the sent-back data, executes $S_{80}$, $S_{81}$ and $S_{82}$ in FIG. 12. Consequently, the terminal A, after accepting the sent-back data in $S_{82}$, then determines in $S_{83}$ the relevant drawing area determined by the document identifier and page number indicated by the thus accepted data. Then, the terminal A determines in $S_{84}$ that the accepted data comprises the returning data of the go-and-return type command. Then, in $S_{90}$, the terminal A performs the relevant deletion operation in accordance with the relevant deletion-operation affecting command indicated by the sent-back and accepted data. Thus, $S_{52}$ of FIG. 11 has been described.

Figure 11:
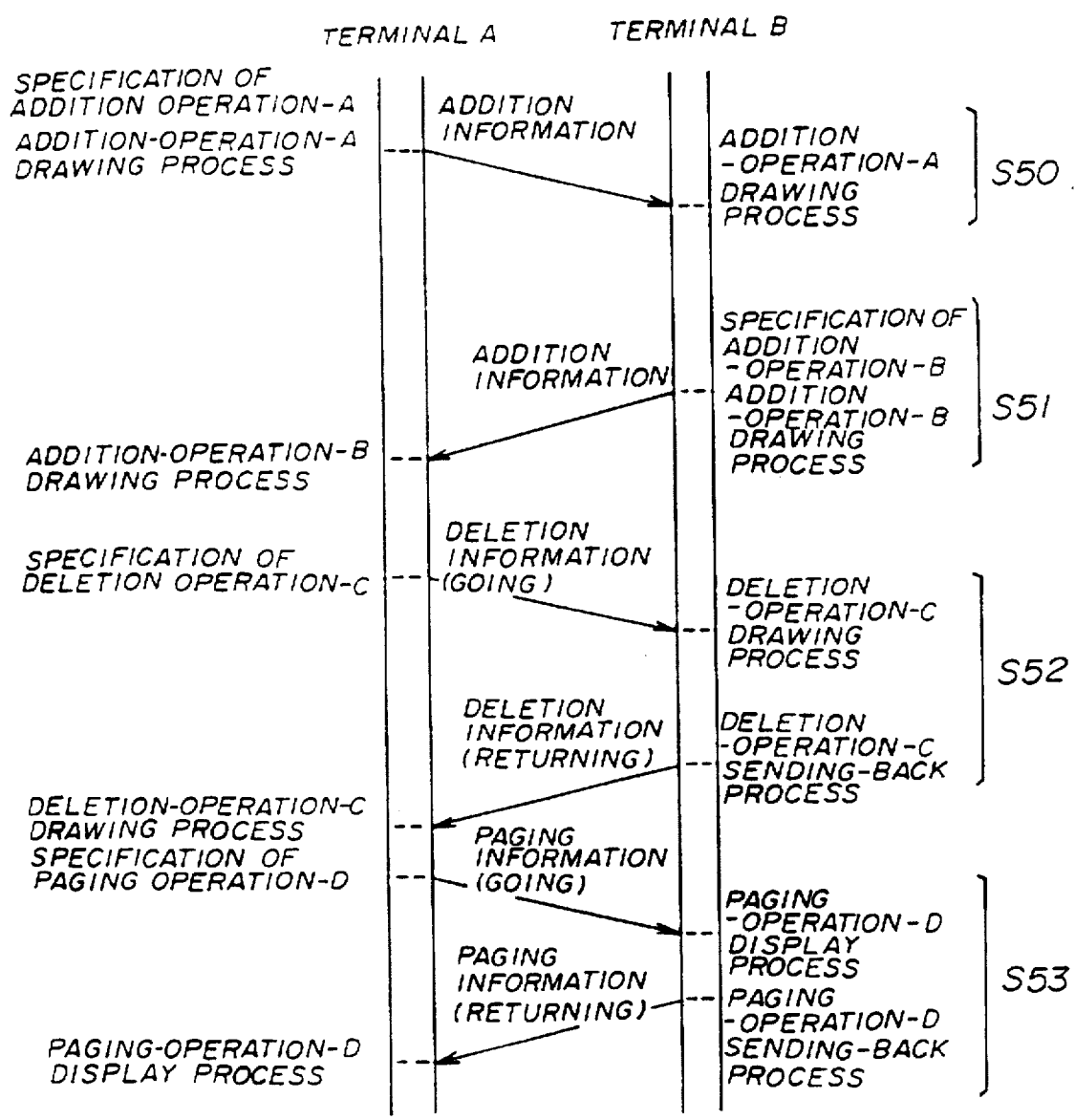
FIG. 11 shows an example of a signal transfer operation sequence of steps $S_{50}$–$S_{53}$ in a second embodiment of the tele-writing system according to the present invention.
Figure 12:
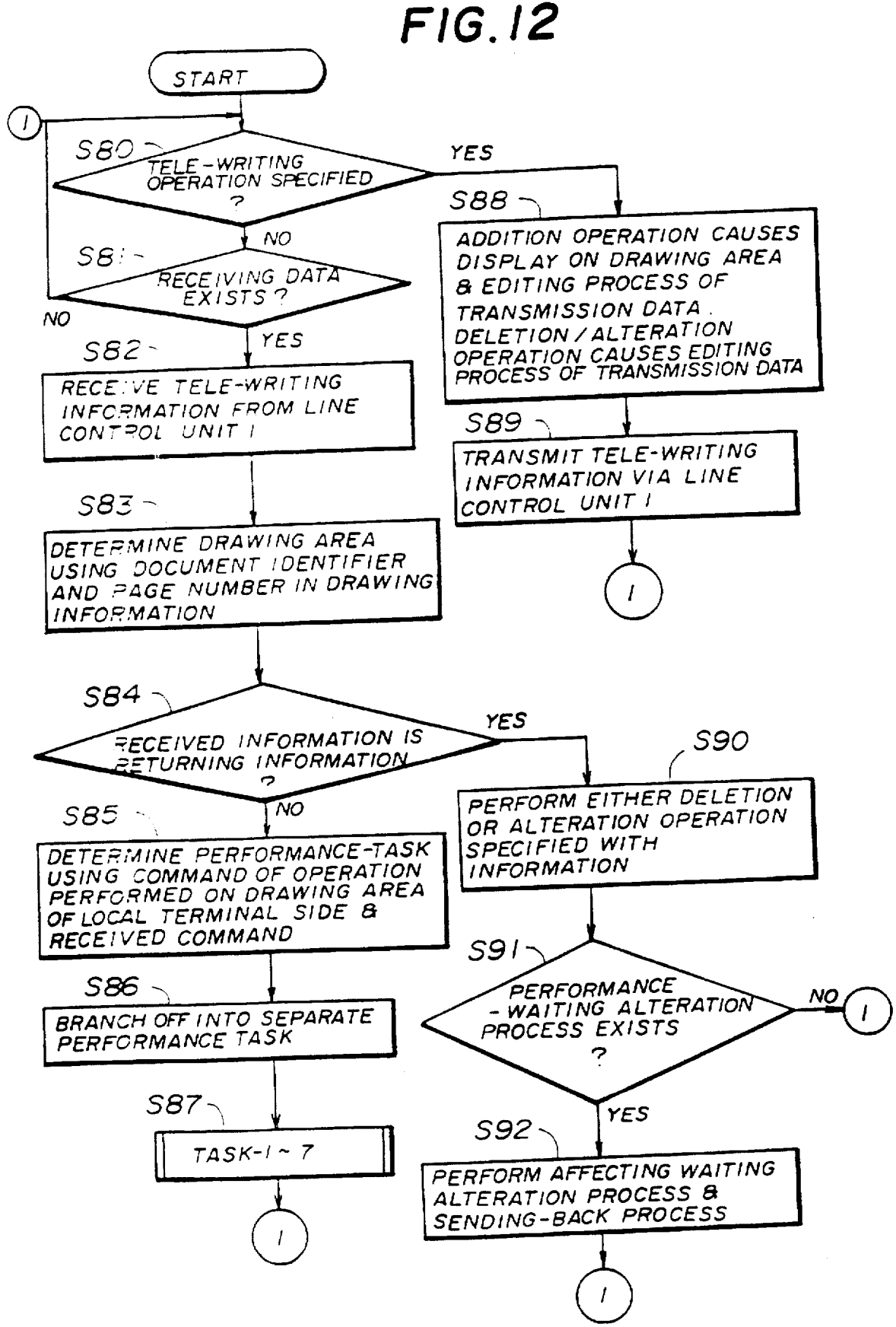
FIG. 12 shows an operation flow in which an addition operation is specified by the operator in the second embodiment of the tele-writing system according to the present invention.

$S_{53}$ of FIG. 11 is one example of a signal-transfer sequence concerning a paging operation, which is an alteration operation. This signal-transfer sequence may be applied to signal-transfer sequences for alteration operations such as a size-magnification operation, a size-reduction operation, and a scrolling operation. Processes in $S_{53}$ are approximately identical to those in $S_{52}$ except for the performance of the alteration operation affecting an identified page in $S_{53}$ instead of the performance of the deletion operation in $S_{52}$.

Figure 15:
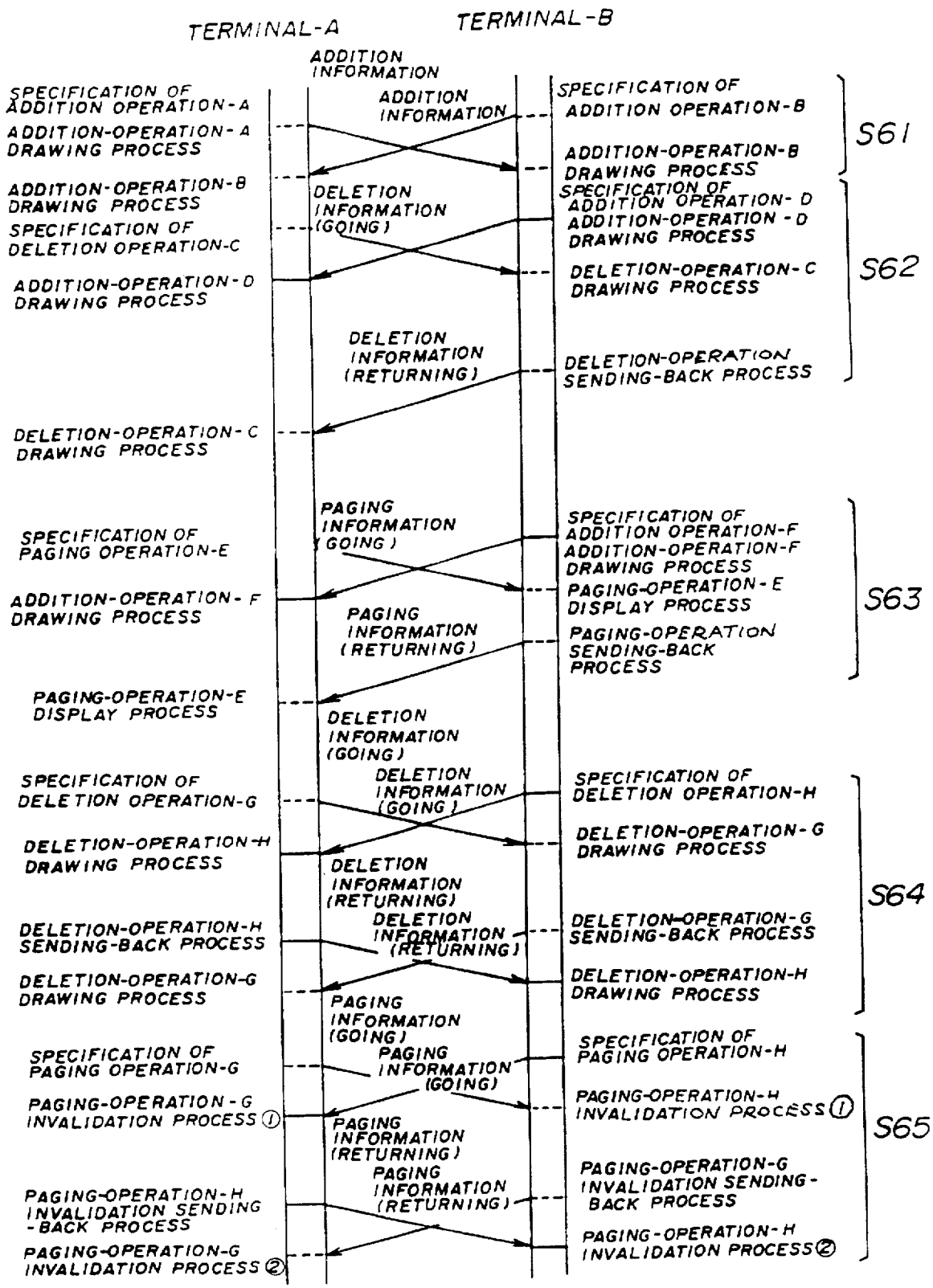
FIG. 15 shows an example of a signal transfer sequence of steps $S_{61}$–$S_{65}$ in the second embodiment of the tele-writing system according to the present invention.

$S_{61}$ of FIG. 15 is an example of a signal transfer sequence in which addition operations are specified by the operators on the respective terminals. This sequence is only a sequence for a case where $S_{50}$ and $S_{51}$ of FIG. 11 are simultaneously carried out and a particular description for the sequence of $S_{61}$ is therefore omitted.

$S_{62}$ is an example of a signal transfer sequence in which an addition operation and a deletion operation are specified by the operators on the terminals, respectively. This sequence is a sequence for a case where $S_{50}$ and $S_{52}$ of FIG. 11 are simultaneously carried out and will now be described with reference to FIG. 12. First, the terminal A, on which a deletion operation C is specified by the operator, determines in $S_{80}$ that a tele-writing operation exists. Because the relevant tele-writing operation comprises the deletion operation, the terminal A correspondingly edits transmission data in $S_{88}$ and then sends the edited data to the remote terminal B via the line control unit in $S_{89}$. Subsequently, the terminal A carries out $S_{80}$ and $S_{81}$ thus determining that an addition operation-D specified by the operator on the terminal B exists, and executing the subsequent step corresponding to the result YES of $S_{81}$.

Figure 14A:
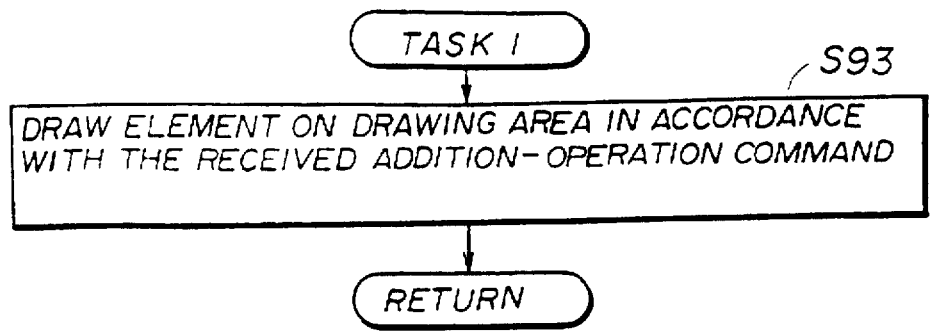
FIGS. 14A, 14B and 14C show operation flows of TASKs 1–3 respectively in the second embodiment of the tele-writing system according to the present invention.

Subsequently, the terminal A accepts the data sent from the terminal B in $S_{82}$, then determines a drawing area using document identifier and page number indicated by the accepted data in $S_{83}$, and determines in $S_{84}$, using the terminal number indicated by the accepted data, whether or not the command indicated by the accepted data comprises a returning command of a go-and-return type command. In this case, because the relevant command corresponds to the addition operation and thus comprises a one-way command, the terminal A executes the subsequent step corresponding to the result NO of $S_{84}$. Then, in $S_{85}$, an affecting task is to be determined in accordance with the determination table shown in FIG. 13. In this case, the terminal A now acting as the local-terminal is in the deletion operation and the data received from the terminal B now acting as a remote terminal comprises an addition-operation affecting command. As a result, TASK-1 is selected. Subsequently, the terminal A branches off into the selected TASK-1 in $S_{86}$ and executes TASK-1 accordingly in $S_{87}$. In the processes of TASK-1 as shown in FIG. 14A, the terminal A draws a specified element in the determined drawing area in accordance with the received addition-operation affecting command in $S_{93}$.

Processes in the terminal B will now be described. The terminal B, having an additional operation D specified by the operator on it, thus determines in $S_{80}$ that tele-writing operation exists. Because the relevant tele-writing operation comprises the addition operation, in $S_{86}$, the terminal B draws the appropriate object in the relevant drawing area and correspondingly edits transmission information. Then, the terminal B sends the edited data to the terminal A in $S_{89}$. Then, the terminal B executes $S_{80}$ and $S_{81}$ so as to determine that the received data, indicating the deletion operation C, sent from the terminal A, exists. Thus, the terminal B executes the subsequent step corresponding to the result YES of $S_{81}$. Then, the terminal B accepts the data sent from the terminal A in $S_{82}$ and determines the relevant drawing area using document identifier and page number indicated by the accepted data in $S_{83}$. Then, the terminal B determines using the terminal number indicated by the accepted data, in $S_{84}$, whether or not the command indicated by the accepted data is the returning command of the go-and-return type command. In this case, because the deletion-operation affecting command comprises the going command of the go-and-return type command, the terminal B executes the subsequent step corresponding to the result NO of $S_{84}$. In $S_{85}$, the terminal B determines an affecting task in accordance with the table shown in FIG. 13. In this case, the terminal B now acting as a local-terminal is in the addition operation and the data received from the terminal A now acting as a remote terminal comprises a deletion-operation affecting command. As a result, TASK-2 is selected.

Figure 14B:
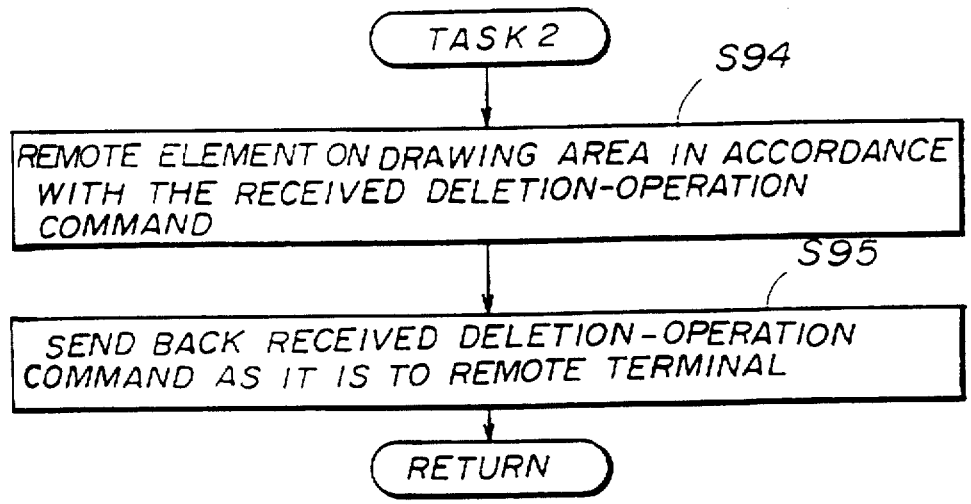
Figure 14C:
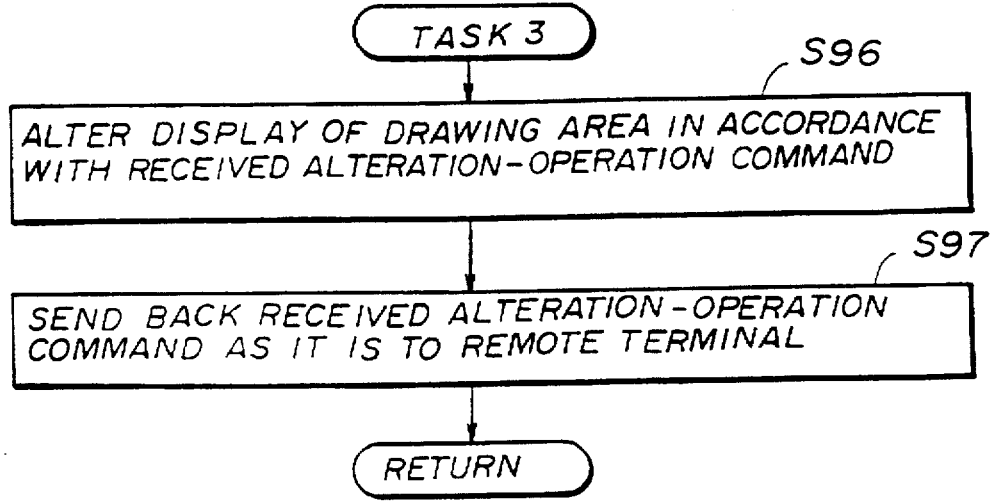

Subsequently, the terminal B branches off into the selected TASK-2 in $S_{86}$ and executes TASK-2 accordingly in $S_{87}$. In the processes of TASK-2 as shown in FIG. 14B, the terminal B removes a specified element from the determined drawing area in accordance with the received deletion-operation affecting command in $S_{94}$. Then, because the deletion-operation affecting command comprises the go-and-return type command, the terminal B sends back the received data as it is to the remote terminal A in $S_{95}$. Then the terminal A, after receiving the data thus sent back from the terminal B, executes $S_{80}$, $S_{81}$ and $S_{82}$ respectively so as to accept the thus sent-back data. Then, the terminal A determines in $S_{83}$ the relevant drawing area using the document identifier and page number indicated by the thus accepted data. Then, the terminal A determines in $S_{84}$ that the command indicated by the accepted data comprises the returning information. As a result, the terminal A executes the corresponding deletion affecting the determined drawing area in $S_{90}$. Thus, $S_{62}$ of FIG. 15 has been described.

Figure 16:
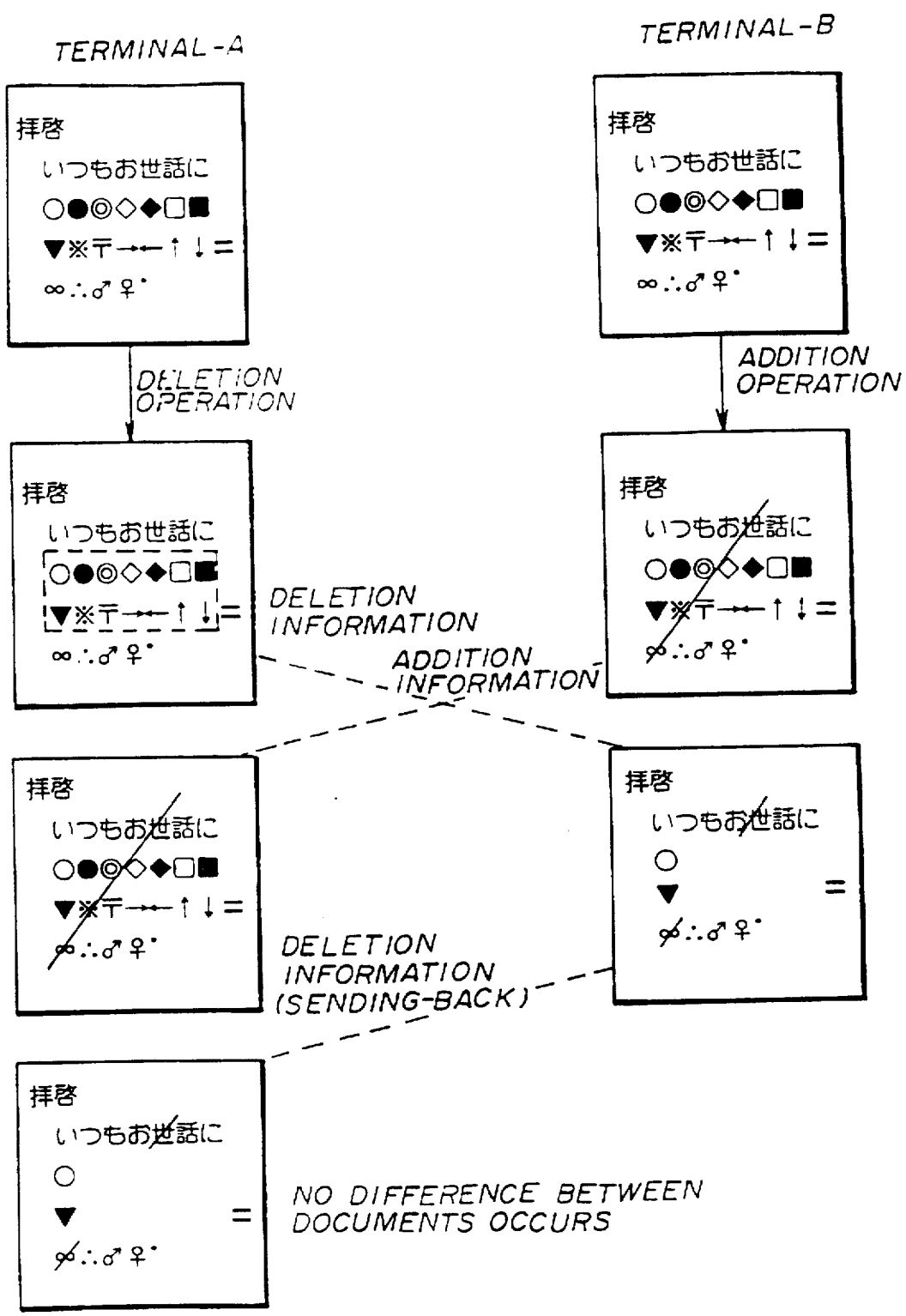
FIG. 16 shows variation of pictures displayed on the terminals where performance of a deletion operation takes effect in response to receiving a returned command in the second embodiment of the tele-writing system according to the present invention.

The reason that the terminal does not execute the relevant deletion action immediately after the corresponding deletion operation is specified by the operator on the terminal but rather performs the action when the terminal receives the corresponding returning command, will now be described. Such a procedure is applied to the case of $S_{62}$ where an addition operation and a deletion operation are simultaneously specified by the operators on the respective terminals. If both a deletion-operation affecting command and an addition-operation affecting command are similar one-way commands and processes associated with these commands are also similar, a phenomenon shown in FIG. 10 will occur. That is, first the deletion action is performed and then the addition action is performed in the terminal A. On the other hand, first the addition action is performed and then the deletion action is performed in the terminal B. If such actions are performed on the mutually duplicated drawing areas of the respective terminals, the result is different in the drawing areas of the respective terminals. In order to prevent such a difference from occurring, the deletion command is made to be of the command type go-and-return. The deletion is not performed when the deletion operation is specified by the operator but the corresponding affecting information is sent to the remote terminal. Then, the deletion action is performed when the corresponding returning command is received. As a result, each picture of the respective drawing areas is changed as shown in FIG. 16, no difference existing between the final pictures each located at the bottom of FIG. 16. The above described operations concerning the deletion-operation affecting command correspond to the series of changed pictures shown in FIG. 16.

Figure 17:
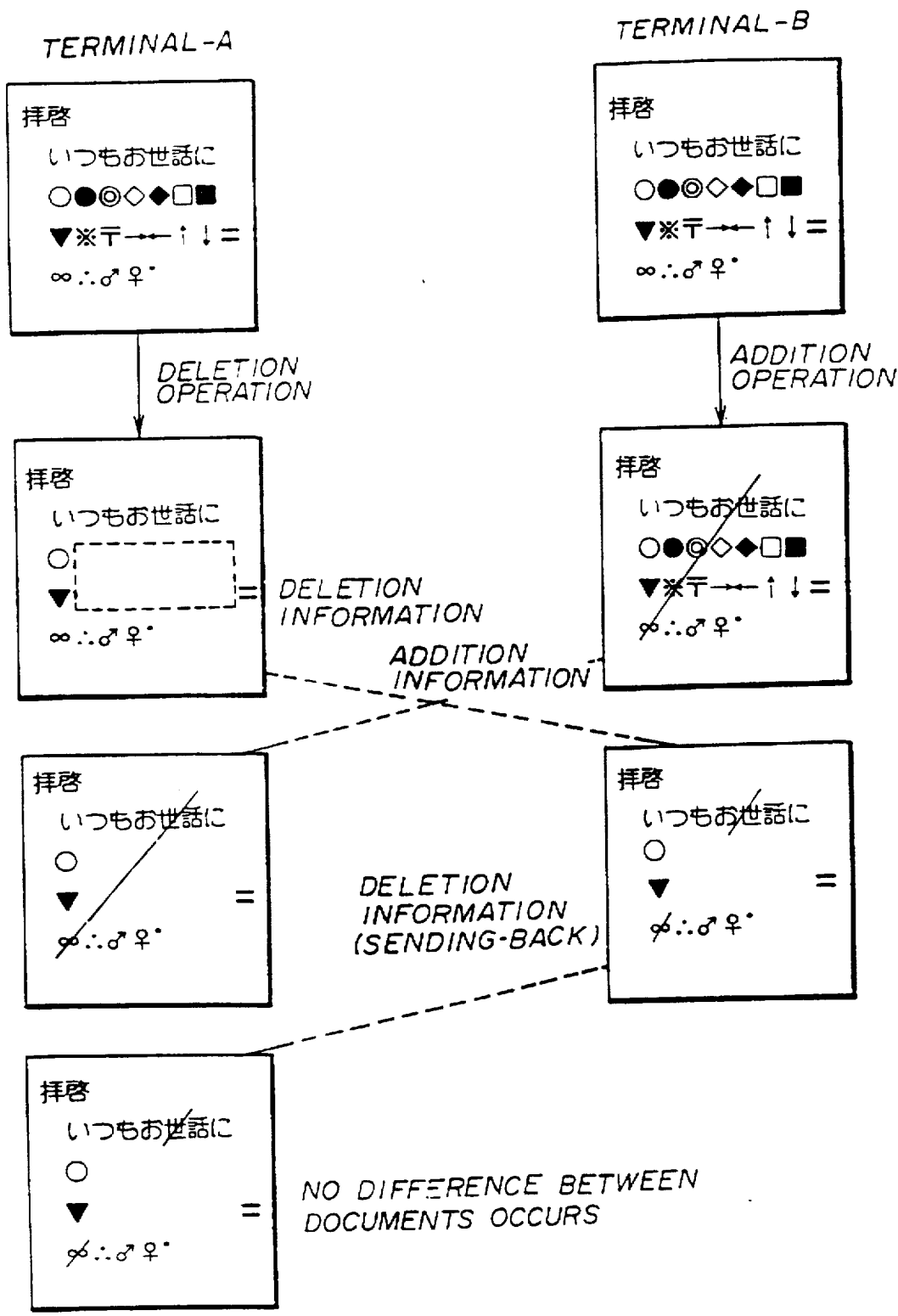
FIG. 17 shows variation of the pictures in the same case as in FIG. 16 but resulting from improvement in operation procedure being performed on the process of FIG. 16 in the second embodiment of the tele-writing system according to the present invention.

However, there arises another problem as follows: Since the deletion action is performed after receiving of the corresponding returning command, a certain time lag is created between the start of specification of the relevant operation by the operator and the realization of the corresponding effect. Such a time lag may degrade the operation performance. In order to eliminate such a problem, the tele-writing terminal device in the second embodiment of the tele-writing system according to the present invention may be made so that the resulting picture changing process is one as shown in FIG. 17. In this case, with a view point to better operation performance, the deletion action is performed immediately after the corresponding deletion operation is specified by the operator. Then, in order to eliminate the difference between documents, the same deletion action is again performed when the corresponding returning command is received. In this case, even though the same deletion action is performed twice, both the requirements, better operation performance and document-difference elimination, can be fulfilled. Actually, the description of the tele-writing terminal device in the second embodiment is generally based on the operation procedure resulting in the picture changing as shown in FIG. 16, in order to simplify the description. The above-described basic scheme concerning the deletion-operation affecting command is similar to that concerning the alteration-operation affecting command. Therefore, the alteration-operation affecting command is also of the go-and-return type. However, there are schemes that are specific to the alteration-operation affecting command. These specific schemes will be described below in the description of the tele-writing terminal device in the second embodiment.

$S_{63}$ of FIG. 15 is an example of a signal transfer sequence in which an addition operation and a paging operation are specified by the operators on the terminals, respectively. This sequence is a sequence for a case where $S_{50}$ and $S_{53}$ of FIG. 11 are simultaneously carried out and will now be described with reference to FIG. 12. First, the terminal A, on which a paging operation E is specified by the operator, determines in $S_{80}$ that a tele-writing operation exists. Because the relevant tele-writing operation comprises the paging operation, the terminal A correspondingly edits transmission data in $S_{88}$ and then sends the edited data to the remote terminal B via the line control unit in $S_{89}$.

Subsequently, the terminal A carries out $S_{80}$ and $S_{81}$ thus determining that an addition operation D specified by the operator on the terminal B exists, thus executing the subsequent step corresponding to the result YES of $S_{81}$. Subsequently, the terminal A accepts the data sent from the terminal B in $S_{82}$, then determines a drawing area using document identifier and page number indicated by the accepted data in $S_{83}$, and determines in $S_{84}$, using the terminal number indicated by the accepted data, whether or not a command indicated by the accepted data comprises a returning command of a go-and-return type command. In this case, because the relevant command corresponds to the addition operation and thus comprises a one-way command, the terminal A executes the subsequent step corresponding to the result NO of $S_{84}$. Then, in $S_{85}$, an affecting task is determined in accordance with the determination table shown in FIG. 13. In this case, the terminal A now acting as the local-terminal is in the alteration operation (paging operation) and the data received from the terminal B now acting as a remote terminal comprises an addition-operation affecting command. As a result, TASK-1 is selected. Subsequently, the terminal A branches off into the selected TASK-1 in $S_{86}$ and executes TASK-1 accordingly in $S_{87}$. In the processes of TASK-1 as shown in FIG. 14A, the terminal A draws a specified element on the determined drawing area in accordance with the received addition-operation affecting command in $S_{93}$.

Processes in the terminal B will now be described. The terminal B, having an addition operation D specified by the operator, thus determines in $S_{80}$ that a tele-writing operation exists. Because the relevant tele-writing operation comprises the addition operation, in $S_{86}$, the terminal B draws the appropriate element in the relevant drawing area and correspondingly edits transmission information. Then, the terminal B sends the edited data to the terminal A in $S_{89}$.

Then, the terminal B executes $S_{80}$ and $S_{81}$ thus determining that the received data, indicating the paging operation-E, sent from the terminal A, exists. Then, the terminal B executes the subsequent step corresponding to the result YES of $S_{81}$. Then, the terminal B accepts the data sent from the terminal A in $S_{82}$ and determines the relevant drawing area using the document identifier and page number indicated by the accepted data in $S_{83}$. Then, the terminal B determines using the terminal number indicated by the accepted data, in $S_{84}$, whether or not the command indicated by the accepted data is the returning command of the go-and-return type command. In this case, because the paging-operation affecting command comprises the going command of the go-and-return type command, the terminal B executes the subsequent step corresponding to the result NO of $S_{84}$. In $S_{85}$, the terminal B determines an affecting task in accordance with the table shown in FIG. 13. In this case, the terminal B now acting as the local-terminal is in the addition operation and the data received from the terminal A now acting as a remote terminal comprises an alteration-operation (paging-operation) affecting command. As a result, TASK-4 is selected.

Figure 18A:
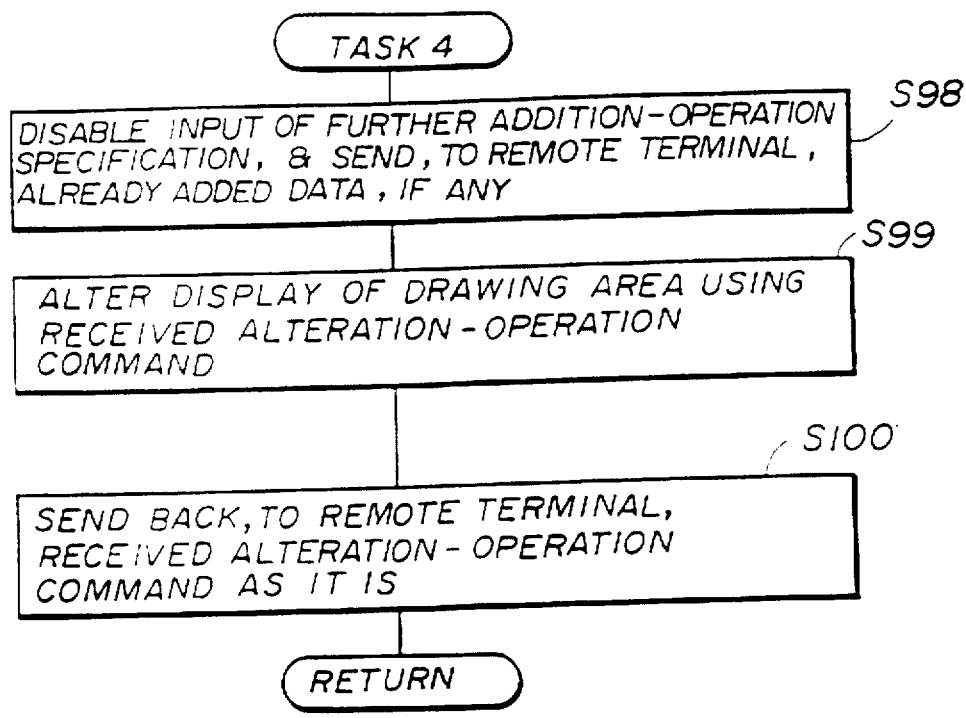
FIGS. 18A and 18B show operation flows of TASKs 4 and 5 respectively in the second embodiment of the tele-writing system according to the present invention.

Subsequently, the terminal B branches off into the selected TASK-4 in $S_{86}$ and executes TASK-4 accordingly in $S_{87}$. In the processes of TASK-4 as shown in FIG. 18A, first the terminal B disables input of further addition operations (that is, any attempt to specify another operation is ignored, for example) by the operator and sends, to the remote terminal A, data associated with an addition executed due to an already-specified addition operation by the operator, if it exists, in $S_{98}$. This halting is carried out so as to make coincident areas on the common pictures which the relevant tele-writing operations affect. Then, the terminal B alters a certain object on the relevant drawing area in accordance with the received paging-operation affecting command in $S_{99}$. Then, because the paging-operation affecting command is an alteration-operation affecting type command, the terminal B sends back the received data, as it is, as the returning command, to the remote terminal A in $S_{100}$.

Terminal A, after receiving the data thus sent back from the terminal B, executes $S_{80}$, $S_{81}$ and $S_{82}$ respectively so as to accept the thus sent-back data. Then, the terminal A determines in $S_{83}$ the relevant drawing area using the document identifier and page number indicated by the accepted data. Then, the terminal A determines in $S_{84}$ that the command indicated by the accepted data comprises the returning information of the paging information. As a result, the terminal A correspondingly alters the object in the relevant drawing area and then displays the drawing area, on the common picture, resulting from the alteration in $S_{90}$. Thus, $S_{63}$ of FIG. 15 has been described.

$S_{64}$ of FIG. 11 is one example of a signal-transfer sequence wherein deletion operations are simultaneously specified by the operators on both the terminals respectively. This signal-transfer sequence is only a sequence for a case where steps each corresponding to $S_{52}$ of FIG. 11 are simultaneously carried out and a particular description for the sequence of $S_{64}$ will be omitted accordingly.

$S_{65}$ is an example of a signal transfer sequence in which alteration operations are simultaneously specified by the operators on the terminals, respectively. This sequence is a sequence for a case where steps each corresponding to $S_{53}$ of FIG. 11 are simultaneously carried out and will now be described with reference to FIG. 12. First, the terminal A, on which a paging operation G is specified by the operator, thus determines in $S_{80}$ that a tele-writing operation exists. Because the relevant tele-writing operation comprises the paging operation, the terminal A correspondingly edits transmission data in $S_{88}$ and then sends the edited data to the remote terminal B via the line control unit in $S_{89}$.

Figure 19:
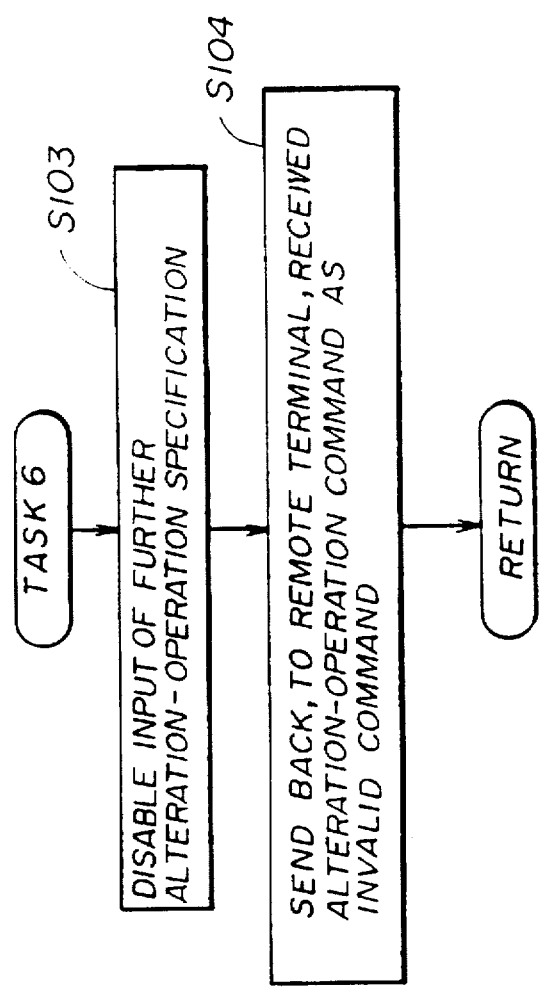
FIG. 19 shows an operation flow of TASK 6 in the second embodiment of the tele-writing system according to the present invention.
Figure 20:
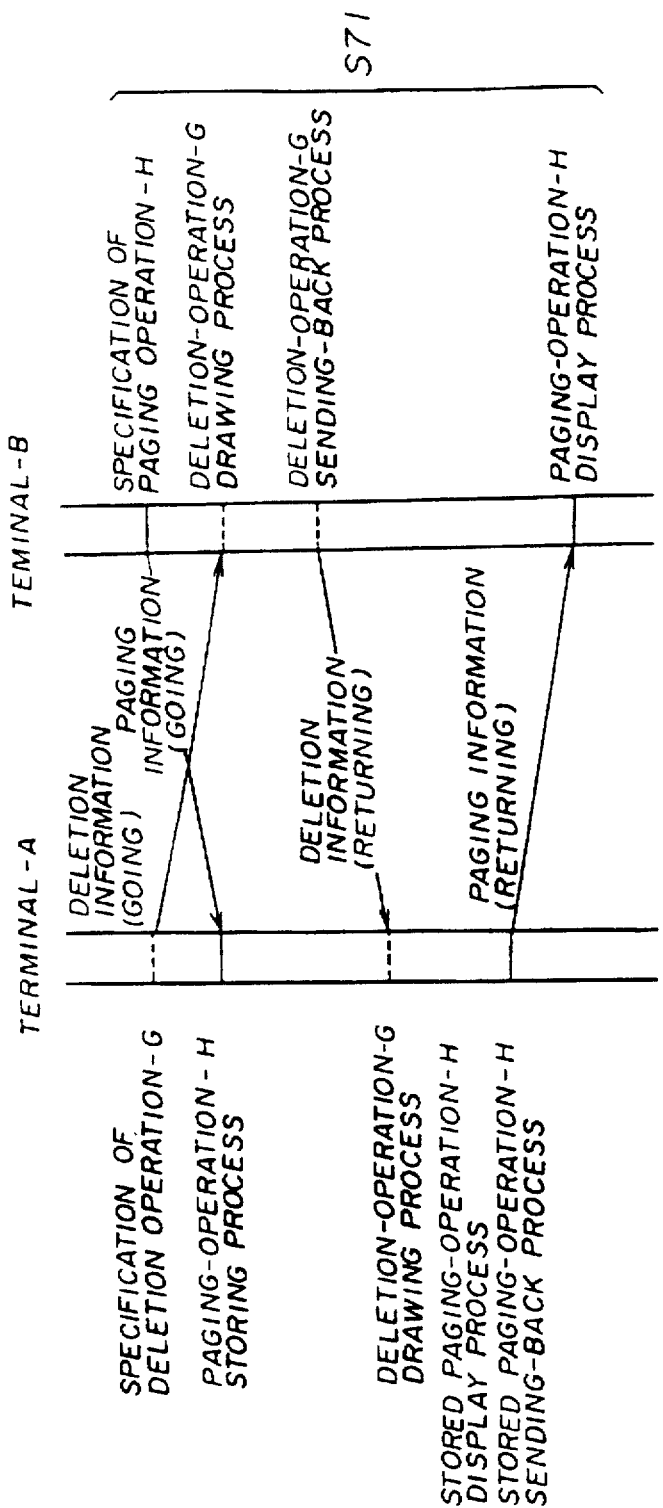
FIG. 20 shows an example of a signal transfer sequence of a step $S_{71}$ in the second embodiment of the tele-writing system according to the present invention.

Subsequently, the terminal A carries out $S_{80}$ and $S_{81}$ thus determines that a paging operation G specified on the terminal B by the operator exists, and executing the subsequent step corresponding to the result YES of $S_{81}$. Subsequently, the terminal A accepts the data sent from the terminal B in $S_{82}$, then determines a drawing area using the document identifier and page number indicated by the accepted data in $S_{83}$, and determines in $S_{84}$, using the terminal number indicated by the accepted data, whether or not the command indicated by the accepted data comprises a returning command of a go-and-return type command. In this case, because the relevant command corresponds to the paging operation and thus comprises the going command of the go-and-return type command, the terminal A executes the subsequent step corresponding to the result NO of $S_{84}$. Then, in $S_{85}$, an affecting task is determined in accordance with the determination table shown in FIG. 13. In this case, the terminal A now acting as the local-terminal is in the alteration (paging) operation and the data received from the terminal B now acting as a remote terminal comprises an alteration (paging)-operation affecting command. As a result, TASK-6 is selected. Subsequently, the terminal A branches off into the selected TASK-6 in $S_{86}$ and executes TASK-6 accordingly in $S_{87}$. In the processes of TASK-6 as shown in FIG. 19, the terminal A disable input of further alteration operations by the operator in $S_{103}$. Then, the terminal A edits the received paging-operation affecting command as being an invalid command and then sends back the edited command as the returning command of the go-and-return type command in $S_{104}$.

Processes in the terminal B will now be described and are similar to those in the terminal A described above. That is, the terminal B disables the input of further paging operations H by the operator; and sends back the paging-operation-H affecting command as an invalid command. On the other hand, the terminal A repeats $S_{80}$ and $S_{81}$ so as to wait for a command to be sent back from the remote terminal B. Then, after receiving the sent-back data, the terminal A examines the received data through $S_{82}$ and $S_{83}$. Because it is found that the relevant command comprises the returning command of the go-and-return type command as a result of the examination, the terminal A executes the subsequent step corresponding to the result YES of $S_{84}$. Thus, the terminal A executes $S_{90}$. However, in $S_{90}$, since the received paging-operation affecting command comprises invalid data, the terminal A executes nothing regarding the relevant command. The sequence performed by the terminal B is the same as that performed by the terminal A described above.

The above description is that for the case where paging operations are simultaneously specified by the operators on the terminals, respectively. In such a case, as described above, as a result, the specifications of the paging operations by the operators are canceled. There may be another arrangement of the tele-writing terminal device in the second embodiment, as follows: Priority is given to either one of the terminals; then the paging operation specified by the operator on the terminal having the priority takes effect so that the corresponding paging is realized; and the specification of the paging operation specified on the other terminal by the operator is canceled. Both the arrangement resulting in canceling both the specifications by the operators and the arrangement resulting in activating one and canceling one have the following common concept: If duplicate paging operations are specified, simultaneous paging execution is prevented, such a concept is necessary because simultaneous occurrence of different actions resulting from the paging results in the following phenomenon: The fifth page is displayed in the picture of a first terminal while the third page is displayed in the picture of a second terminal, for example. Thus, coincidence in displayed contents between both terminals can not be ensured. The tele-writing terminal device in the first embodiment of the tele-writing system according to the present invention allows such non-coincidence of displayed contents and normal tele-writing execution is ensured there. On the other hand, in the tele-writing terminal device in the second embodiment of the tele-writing system according to the present invention, such coincidence in displayed contents is mandatory so that storage means is eliminated. The coincidence in displayed contents may be ensured by preventing simultaneous different paging executions from being made.

Figure 18B:
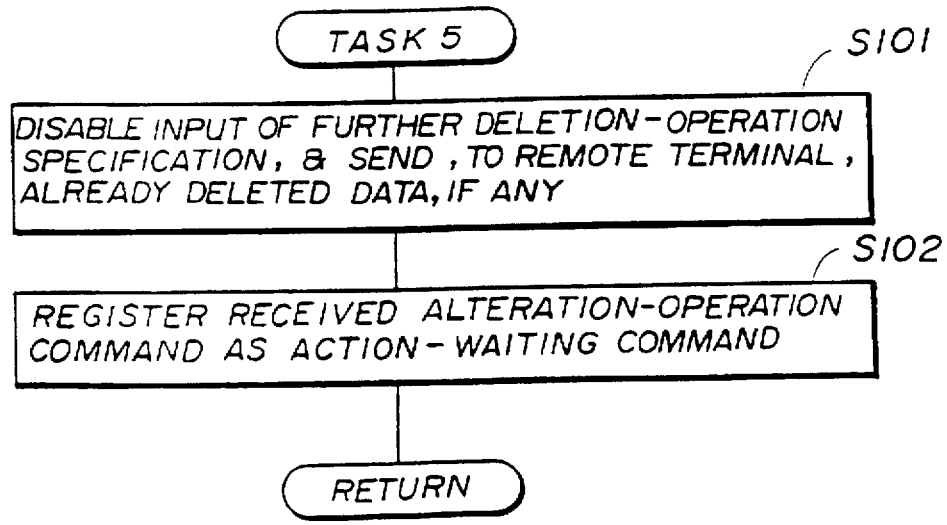

$S_{71}$ is an example of a signal transfer sequence in which a deletion operation and a paging operation are simultaneously specified on the terminals by the operators, respectively. This sequence is a sequence for a case where $S_{52}$ and $S_{53}$ of FIG. 11 are simultaneously carried out and will now be described with reference to FIG. 12. First, the terminal A, on which a deletion operation G is specified by the operator, thus determines in $S_{80}$ that a tele-writing operation exists. Because the relevant tele-writing operation comprises the deletion operation, the terminal A correspondingly edits transmission data in $S_{88}$ and then sends the edited data to the remote terminal B via the line control unit in $S_{89}$. Subsequently, the terminal A carries out $S_{80}$ and $S_{81}$, thus determining that the paging operation H specified on the terminal B by the operator exists, thus executing the subsequent step corresponding to the result YES of $S_{81}$. Subsequently, the terminal A accepts the data sent from the terminal B in $S_{82}$, then determines a drawing area using the document identifier and page number indicated by the accepted data in $S_{83}$, and determines in $S_{84}$, using the terminal number indicated by the accepted data, whether or not the command indicated by the accepted data comprises a returning command of a go-and-return type command. In this case, because the relevant command corresponds to the paging operation and thus comprises the going command of the go-and-return type command, the terminal A executes the subsequent step corresponding to the result NO of $S_{84}$. Then, in $S_{85}$, an affecting task is determined in accordance with the determination table shown in FIG. 13. In this case, the terminal A now acting as the local-terminal is in the deletion operation and the data received from the terminal B now acting as a remote terminal comprises an alteration-operation affecting command (paging). As a result, TASK-5 is selected. Subsequently, the terminal A branches off into the selected TASK-5 in $S_{86}$ and executes TASK-5 accordingly in $S_{87}$. In the processes of TASK-5 as shown in FIG. 18B, the terminal A disables the input of further deletion operation by the operator, and sends data associated with a deletion executed due to an already-specified deletion operation by the operator if it exists, in $S_{101}$. The terminal A does not immediately execute the received paging-operation affecting command and registers the command as an affecting-waiting command in $S_{102}$. Then, the terminal A waits for the deletion-operation affecting command, sent previously as mentioned above, to be sent back. Then, the terminal A executes the sent back deletion-operation affecting command so that the actual deletion of a relevant object from the relevant picture is performed in $S_{90}$ as described below, after receiving the sent back deletion-operation affecting command. Then, after the actual deletion, the terminal A executes the above mentioned received paging-operation affecting command so that the actual paging of the relevant document is performed in $S_{92}$ described below.

Processes in the terminal B will now be described. The terminal B, having the paging operation I specified by the operator, as a result determines in $S_{80}$ that a tele-writing operation exists. Because the relevant existing tele-writing operation comprises the paging operation, the terminal B correspondingly edits transmission data in $S_{88}$. Then, the terminal B sends the edited data to the remote terminal A in $S_{89}$. Then, the terminal B executes $S_{80}$ and $S_{81}$, thus determining the existence of the received data concerning the deletion operation G sent from the terminal A. Thus, the terminal B executes the subsequent step corresponding to the result YES of $S_{81}$. Subsequently, the terminal B accepts the data sent from the terminal A in $S_{82}$, then determines a drawing area using a document identifier and page number indicated by the accepted data in $S_{83}$, and determines in $S_{84}$, using the terminal number indicated by the accepted data, whether or not a command indicated by the accepted data comprises a returning command of a go-and-return type command. In this case, because the relevant command corresponds to the deletion operation and thus comprises the going command of the go-and-return type command, the terminal A executes the subsequent step corresponding to the result NO of $S_{84}$. Then, in $S_{85}$, an affecting task is determined in accordance with the determination table shown in FIG. 13. In this case, the terminal B now acting as the local-terminal is in the alteration (paging) operation and the data received from the terminal A now acting as a remote terminal comprises a deletion-operation affecting command. As a result, TASK-2 is selected. Subsequently, the terminal A branches off into the selected TASK-2 in $S_{86}$ and executes TASK-2 accordingly in $S_{87}$. The processes of TASK-2 have been already described above and the duplicating descriptions is therefore omitted.

The terminal A, after receiving the data sent back from the terminal B, executes $S_{80}$, $S_{81}$ and $S_{82}$ respectively so as to accepts the thus sent-back data. Then, the terminal A determines in $S_{83}$ the relevant drawing area using the document identifier and page number indicated by the thus accepted data. Then, the terminal A determines in $S_{84}$ that the command indicated by the accepted data comprises the returning information of the deletion information. As a result, the terminal A correspondingly removes a specified element from the relevant drawing area in $S_{90}$. Then, since the terminal A has the registered affecting-waiting command, the result of the determination in $S_{91}$ becomes YES. As a result, the terminal A executes the registered affecting-waiting paging-operation affecting command so that the actual paging of the relevant document is performed. Then, the terminal A sends back the relevant paging-operation-H affecting command to the remote terminal B in $S_{92}$. On the other hand, the terminal B, the receiving the paging-operation-H affecting command sent form the terminal A, executes the paging-operation-H affecting command so that the actual paging of the relevant document is performed.

Further, the present invention is not limited to the above described embodiments, and variations and modifications may be made without departing from the scope of the present invention.

What is claimed is:

1. A tele-writing system comprising:
  page and document identifier-adding means for adding a page identifier and a document identifier to tele-writing information sent from a first tele-writing system to a second tele-writing system via telecommunication, said page and document identifiers being used to identify 1) a page of a multi-page document on said first tele-writing system processed and 2) a corresponding page of a corresponding multi-page document to be processed as a result of a first tele-writing operation being specified,
  means, on said second tele-writing system, for executing said first tele-writing operation on a second picture displayed on said second tele-writing system according to said tele-writing information which comprises coordinate information and which modified a first picture on said first tele-writing system, said means for executing including page and document identifying means for identifying, using said page and document identifiers added to said tele-writing information received from said first tele-writing system, the corresponding page of the corresponding multi-page document to be processed as a result of said first tele-writing operation;
  means for adding a sequential number to said tele-writing information to determine whether the page of the multi-page document and the corresponding page of the corresponding multi-page document have equivalent contents; and means for re-executing a second tele-writing operation previously executed on said second tele-writing system when, based on said sequential number, it is determined that 1) a change in an order of operation of said first and second tele-writing operations produces said first and second pictures which are different and 2) said first and second tele-writing operations have been performed at the first tele-writing system in a different order than at said second tele-writing system.

2. The tele-writing system according to claim 1, further comprising:

terminal-number adding means for adding a terminal number to said sending tele-writing information, said terminal number concerning said tele-writing system; and terminal identifying means for identifying, using a terminal number added to said received tele-writing information, said second tele-writing system.

3. The tele-writing system according to claim 2, wherein said terminal number is to be given to a particular tele-writing system such as said tele-writing system.

4. The tele-writing system according to claim 1, further comprising:

means for specifying a drawing area to be updated based on said tele-writing information;

means for updating a common picture displayed on a common screen when the drawing area to be updated is being displayed on the common screen; and means for updating information stored in a storage unit when the drawing area to be updated is not being displayed on said common screen.

5. A tele-writing system comprising:

page and document identifier-adding means for adding a page identifier and a document identifier to tele-writing information sent from a first tele-writing system to a second tele-writing system via telecommunication, said page and document identifiers being used to identify 1) a page of a multi-page document on said first tele-writing system processed and 2) a corresponding page of a corresponding multi-page document to be processed, as a result of a first tele-writing operation being specified.

means, on said second tele-writing system, for executing said first tele-writing operation on a second picture displayed on said second tele-writing system according to said tele-writing information which modified a first picture displayed on said first tele-writing system, said means for executing including page and document identifying means for identifying, using said page and document identifiers added to said tele-writing information received from said first tele-writing system, the corresponding page of the corresponding multi-page document to be processed as a result of said first tele-writing operation;

means for adding a sequential number to said tele-writing information to determine whether the page of the multi-page document and the corresponding page of the corresponding multi-page document have equivalent contents; and means for re-executing a second tele-writing operation previously executed on said second tele-writing system when, based on said sequential number, it is determined that 1) a change in an order of operation of said first and second tele-writing operations produces first and second pictures which are different and 2) said first and second tele-writing operations have been performed at the first tele-writing system in a different order than at said second tele-writing system;

means for specifying a drawing area to be updated based on said tele-writing information;

means for updating a common picture displayed on a common screen when the drawing area to be updated is being displayed on the common screen; and means for updating information stored in a storage unit when the drawing area to be updated is not being displayed on said common screen.

6. A tele-writing system comprising:

a first tele-writing system; and a second tele-writing system, wherein the first tele-writing system comprises:

first identifier-adding means for adding a page identifier and a document identifier to first tele-writing information sent from the first tele-writing system to the second tele-writing system via telecommunication, the first tele-writing information including a first tele-writing operation to be performed based on a first local modification, the page and document identifiers identifying a first page of a first copy of a multi-page document to be processed based on the first tele-writing operation, and means for adding a first locally-specified sequential number to the first tele-writing information; wherein the second tele-writing system comprises:

second identifier-adding means for adding the page and document identifiers to second tele-writing information sent from the second tele-writing system to the first tele-writing system via telecommunication, the second tele-writing information including a second tele-writing operation to be performed, the page and document identifiers identifying the first page of a second copy of the multi-page document to be processed by the first and second tele-writing operations, and means for adding a second locally-specified sequential number to the second tele-writing information;

wherein the first and second tele-writing systems each further comprise:

means for executing the first and second tele-writing operations on respective first and second pictures displayed on the first and second tele-writing systems, respectively, means for using the first and second locally-specified sequential numbers to determine whether the first and second pictures are equivalent after the respective means for executing execute the first and second tele-writing operations, and means for re-executing at least one of the first and second tele-writing operations on a corresponding one of the first and second tele-writing systems to produce first and second pictures which are equivalent, the means for re-executing including means for re-executing the at least one of the first and second tele-writing operations when a change in an order of operation of the first and second tele-writing operations produces first and second pictures which are different and when the first and second tele-writing operations have been performed at the first tele-writing system in a different order than the first and second tele-writing operations were performed at the second tele-writing system.

* * * * *